(12) United States Patent
Muramoto et al.

(10) Patent No.: US 8,031,608 B2
(45) Date of Patent: Oct. 4, 2011

(54) FLOW CONTROL METHOD, TRANSMITTING TERMINAL DEVICE USED IN SAME, RECEIVING TERMINAL DEVICE AND PACKET TRANSFER SYSTEM

(75) Inventors: Eiichi Muramoto, Kanagawa (JP); Takahiro Yoneda, Tokyo (JP); Kazunobu Konishi, Tokyo (JP)

(73) Assignee: Panasonic Corporation, Osaka (JP)

( * ) Notice: Subject to any disclaimer, the term of this patent is extended or adjusted under 35 U.S.C. 154(b) by 185 days.

(21) Appl. No.: 12/443,895

(22) PCT Filed: Aug. 29, 2007

(86) PCT No.: PCT/JP2007/066783
§ 371 (c)(1),
(2), (4) Date: Jun. 3, 2009

(87) PCT Pub. No.: WO2008/041434
PCT Pub. Date: Apr. 10, 2008

(65) Prior Publication Data
US 2010/0074113 A1    Mar. 25, 2010

(30) Foreign Application Priority Data

Oct. 2, 2006    (JP) .................................. 2006-270410

(51) Int. Cl.
*H04L 12/26*    (2006.01)
(52) U.S. Cl. .......... 370/235; 370/230; 370/252; 455/69; 455/91; 709/232
(58) Field of Classification Search .................. 370/235, 370/230, 252; 455/69, 91; 709/232–234
See application file for complete search history.

(56) References Cited

U.S. PATENT DOCUMENTS
5,734,825 A * 3/1998 Lauck et al. .................. 709/233
(Continued)

FOREIGN PATENT DOCUMENTS
JP    10-145424 A    5/1998
(Continued)

OTHER PUBLICATIONS

Takano et al., "Kosoku Network ni okeru Jiritsu Bunsan Flow Seigyo no Anteisei toTekiosei no Kento," IEICE Technical Report, IN2002-181, Jan. 10, 2003, "2. Kanren Kenkyu," "4. Flow Seigyo no Teiseiteki Kiroku".

Muramoto et al., "Proposal for Congestion Control Method on Sender Initiated Multicast," Internet Conference 2003.

(Continued)

*Primary Examiner* — Luat Phung
(74) *Attorney, Agent, or Firm* — Greenblum & Bernstein, P.L.C.

(57) ABSTRACT

It is an object to provide a flow control method in which a packet round trip time is not excessively calculated out and its performance is not unnecessarily deteriorated even at the time of continuously connected packet transfers through relays of a plurality of receiving terminal devices. This method is directed to a flow control method in which the delivery of packets are carried out through relays of a plurality of receiving terminal devices. The method is comprised of steps (S501-S517) for acquiring a packet round trip time for every pair of neighboring terminal devices in a path of the delivery, a selection step for selecting one from the acquired round trip time in accordance with a predetermined standard, and a step (S518) for calculating a packet transmission rate on the basis of the selected round trip time, so that the round trip time of each receiving terminal device is measured and the transmission rate is calculated in accordance with the measured result. Thus, a packet round trip time is not excessively calculated out, and data transmission performance can be improved.

6 Claims, 15 Drawing Sheets

U.S. PATENT DOCUMENTS

| | | | | |
|---|---|---|---|---|
| 2002/0194361 | A1* | 12/2002 | Itoh et al. | 709/233 |
| 2005/0152397 | A1* | 7/2005 | Bai et al. | 370/468 |
| 2010/0180172 | A1* | 7/2010 | Weimann et al. | 714/750 |

FOREIGN PATENT DOCUMENTS

| | | |
|---|---|---|
| JP | 2002-374302 | 12/2002 |
| JP | 2004-135065 A | 4/2004 |
| WO | 2002/025878 A1 | 3/2002 |

OTHER PUBLICATIONS

Handley et al., "TCP Friendly Rate Control (TFRC): Protocol Specification," RFC 3448, Jan. 2003.

Imai et al., "XCAST6: eXplicit Multicast on IPv6," IEEE/IPSJ SAINT2003 Workshop 4, IPv6 and Applications, Orland, Jan. 2003.

Chu et al., "A Case for End System Multicast," IEEE Journal on Selected areas in Communications, vol. 20, Issue 8, Oct. 2002, pp. 1456-1471.

* cited by examiner

FLOW CONTROL METHOD, TRANSMITTING TERMINAL DEVICE USED IN SAME, RECEIVING TERMINAL DEVICE AND PACKET TRANSFER SYSTEM

TECHNICAL FIELD

The present invention relates to a flow control method for delivering video and audio data or the like in packets to a plurality of terminals, and a transmitting terminal, receiving terminal and packet transport system for use in this flow control method.

BACKGROUND ART

When data is delivered in packets to a plurality of terminals over a network, the flow of data to transmit needs to be controlled according to the conditions of the network and receiving terminals.

Especially, when delivering data over the Internet, it is necessary to impartially share the bands with other traffic other than video and audio data on the Internet. Most of other traffic on the Internet is traffic using TCP (Transport Control Protocol). For this reason, it is well settled that fairly sharing the band with other traffic on the Internet may be realized through flow control so that the band is shared fair with traffic using TCP. That is, it is well settled that flow control having good affinity with TCP is best to be performed when delivering data over the Internet.

Meanwhile, when data is delivered to a plurality of terminals, it is possible that the terminals have different capacities. To be more specific, while the speed of only several Mbps (megabits per second) is allowable to terminals connected to the Internet via ADSL (Asymmetric Digital Subscriber Line), terminals connected to the Internet via optical fiber can deliver data at a speed of 100 Mbps. When data delivery is performed simultaneously to terminals connected to the Internet via ADSL and terminals connected to the Internet via optical fiber, a scheme of performing flow control such that data is delivered at a speed not exceeding the speed allowable to the slowest terminal, that is, a terminal connected via ADSL, is known. To be more specific, for example, a flow control scheme using TFMCC (TCP Friendly Multicast Congestion Control) is known.

However, with these schemes, when there are receiving terminals of various speeds, receiving terminals having high capacity cannot receive sufficient data delivery. Referring back to the aforementioned example, although a terminal that is connected via optical fiber has a receiving capacity of 100 Mbps, the terminal can receive data delivery only at several Mbps. Such a situation produces unfairness in the same session (i.e. data delivery) and is referred to as "intra-session unfairness." Therefore, the flow control scheme for delivering data to a plurality of terminals is expected to be able to realize a state in which all receiving terminals can receive data at their maximum capacities, that is, maintain fairness in sessions and resolve intra-session unfairness.

The SICC (Sender Initiated Congestion Control) scheme is known as a flow control scheme for resolving intra-session unfairness while keeping affinity with TCP (e.g. see Non-Patent Document 1).

Furthermore, the TFRC (TCP Friendly Rate Control) scheme is known as a scheme for estimating the rate at which data can be transmitted (e.g. see Non-Patent Document 2).

The SICC scheme is a transmission scheme for realizing flow control using this TFRC scheme in a type of multicast-based communication in which a transmitting terminal explicitly specifies a list of destination addresses of receiving terminals such as an XCAST (eXplicit Multicast) scheme.

Here, the SICC scheme will be explained in detail.

SICC-based transmitting terminals have a plurality of classes sending packets at different rates. The transmitting terminal estimates the rates data can be transmitted to the receiving terminals, based on the TFRC scheme, and classifies the individual receiving terminals into the above-described plurality of appropriate classes, based on the estimated values. The transmitting terminal delivers XCAST packets, in which the addresses of the receiving terminals classified into classes are specified.

A transmittable rate is estimated based on feedback from a receiving terminal about a round trip time (RTT) of a packet between a transmitting terminal and the receiving terminal. This transmittable rate is estimated based on the TFRC scheme, which is a scheme that fulfills affinity with TCP. Therefore, the flow control exercised by the SICC scheme fulfills affinity with TCP.

By the SICC scheme, transmittable rates are estimated based on the TFRC scheme and the receiving terminals are classified into appropriate classes based on the estimated transmittable rates. Therefore, by the SICC scheme, it is possible to drastically improve fairness within a session while fulfilling affinity with TCP without the speed being limited by a receiving terminal having the lowest transmittable rate during delivery of a packet.

By the way, measuring RTTs is indispensable to the estimation of transmittable rates by the TFRC scheme as described above. With the TFRC scheme, a transmittable rate Xcal is estimated based on following equation 1.

[1]

$$Xcal = \frac{8s}{R(\sqrt{2p/3} + t\_RTO \times \sqrt{3p/8} \times p \times (1 + 32p^2))} \quad \text{(Equation 1)}$$

In equation 1, "R" is the RTT, "p" is the loss event rate, "s" is the packet size and "t_RTO" is the timeout value used in TCP. 4Rs are generally used for t_RTO. Since R is the denominator of equation 1, it is obvious that the transmittable rate Xcal is inversely proportional to RTT and that the transmittable rate Xcal decreases as RTT increases.

As the scheme for delivering packets to a plurality of terminals as described above, the SICC scheme uses, for example, the XCAST scheme disclosed in Non-Patent Document 3.

The XCAST scheme disclosed in Non-Patent Document 3 is a scheme for explicitly specifying all receiving terminals to which the transmitting side delivers a packet by the transmitter by storing the destination addresses of all receiving terminals belonging to a predetermined group in the option header or payload in the packet. According to this XCAST scheme, when a relay router located between a transmitting node and a receiving node does not support the XCAST scheme, a packet delivered to the relay router is identified by the destination address and delivered to one receiving terminal to which no packet has been delivered yet. When there still remains a destination to which the packet has not been delivered yet, the receiving terminal having received the packet retransmits the packet to the destination to which the packet has not been delivered yet. When the receiving terminal repeats such relay operation, packets are delivered to all receiving terminals.

That is, even if the relay router does not support the XCAST scheme, a plurality of receiving terminals carry out concatenated transfer in the XCAST scheme, and the packet can thereby be delivered to the receiving terminals.

Non-Patent Document 1: E. Muramoto, et al., "Proposal for Congestion Control Method on Sender Initiated Multicast," Internet Conference 2003

Non-Patent Document 2: M. Handley, et al., "TCP Friendly Rate Control (TFRC): Protocol Specification", RFC 3448, January 2003

Non-Patent Document 3: Y. Imai, et al., "XCAST6: eXplicit Multicast on IPv6," IEEE/IPSJ SAINT2003 Workshop 4, IPv6 and Applications, Orland, January 2003

DISCLOSURE OF INVENTION

Problems to be Solved by the Invention

However, the flow control method whereby the SICC scheme is applied to XCAST and the TFRC scheme is used as the scheme to estimate rates, has a problem of performing flow control at an unnecessarily low rate when the relay router does not support the XCAST scheme and concatenated transfer has to be carried out. This is attributable to the fact that RTT increases when concatenated transfer is carried out. Here, this problem will be explained.

FIG. 1 is a configuration diagram showing a configuration of a conventional packet transport system.

Packet delivery system 1600 shown in FIG. 1 is comprised of transmitting terminal 1601, receiving terminals 1605 to 1608 and Internet 1612. In FIG. 1, the classes of transmitting terminal 1601 classified in the SICC scheme are class A1602 having a transmission rate of 1 Mbps, class B1603 having a transmission rate of 512 Kbps and class C1604 having a transmission rate of 256 Kbps.

Transmitting terminal 1601 delivers a packet to receiving terminals 1605 to 1608 using class A1602, class B1603 and class C1604 via Internet 1612 using the SICC scheme. FIG. 1 shows a situation in which one receiving terminal 1605 belongs to class A1602, three receiving terminals 1606 to 1608 belong to class B1603 and 0 receiving terminals belong to class C1604, and packets are being delivered using the XCAST scheme. Transmission route 1610 is a data delivery route from transmitting terminal 1601 to receiving terminal 1605 corresponding to class A1602. Transmission route 1611 is a data delivery route from transmitting terminal 1601 to receiving terminals 1606 to 1608 corresponding to class B1603. In this case, RTT measurement route 1609 when measuring the RTT between transmitting terminal 1601 and receiving terminal 1608 is a concatenated route starting from transmitting terminal 1601, through receiving terminals 1606 and 1607, to receiving terminal 1608, and the RTT of this concatenated route is fed back to transmitting terminal 1601.

That is, as shown by RTT measurement route 1609, flow control is conventionally performed using the RTT of the entire interval using the TFRC scheme even when a packet containing data is delivered through concatenated routes.

However, if affinity with TCP is maintained in an interval where contention with other traffic is most severe among all intervals of the RTT measurement route (bottleneck interval), affinity with TCP is assumed to be maintained in other intervals, too. Nevertheless, the conventional method measures the entire route from transmitting terminal 1601 to receiving terminal 1608, and performs flow control at an unnecessarily low rate.

That is, when the SICC scheme is applied to the XCAST scheme, the prior art carries out concatenated transfer and RTT is thereby calculated as a large value, which causes the transmittable rate to be calculated as a small value, which results in a problem that the performance of data transmission deteriorates.

It is therefore an object of the present invention to provide a flow control method whereby the performance of packet transmission can be improved significantly without calculating RTT as a large value even while concatenated transfer is carried out.

Means for Solving the Problem

The flow control method of the present invention delivers a packet by relay by a receiving terminal, and this flow control method adopts a configuration including the steps of: calculating, for each pair of terminals adjoining on a delivery route, a round trip time the packet takes between the each pair of terminals; selecting one of round trip times calculated, based on a predetermined reference; and calculating a transmission rate of the packet, based on the round trip time selected.

The receiving terminal of the present invention relays a packet sent from a transmitting terminal to another receiving terminal, and this receiving terminal adopts a configuration including: a measurement packet transmitting section that transmits to the another receiving terminal a packet containing measurement information for measuring a round trip time the packet takes between the receiving terminal and the another receiving terminal; a receiving section that receives a reply packet sent from the another receiving terminal in response to the packet containing the measurement information; a round trip time information acquiring section that acquires time information about the round trip time of the packet, based on the reply packet received in the receiving section; and a round trip time information transmitting section that transmits to the transmitting terminal the packet containing the time information acquired in the round trip time information acquiring section.

The transmitting terminal of the present invention delivers a packet via receiving terminal that relays the packet, and this transmitting terminal adopts a configuration including: a receiving section that receives, for each pair of terminals adjoining on a delivery route, a packet containing information about a round trip time the packet takes between the each pair of terminals; a round trip time acquiring section that calculates the round trip time from the packet received in the receiving section; a selection section that selects one of round trip times calculated in the round trip time acquiring section, based on a predetermined reference; and a calculation section that calculates a transmission rate of the packet, based on the round trip time selected in the selection section.

The packet transport system of the present invention delivers a packet transmitted from a transmitting terminal by relay by a receiving terminal and this packet transport system adopts a configuration in which: the receiving terminal comprises: a measurement packet transmitting section that transmits a packet containing measurement information for measuring a round trip time the packet takes between the receiving terminal and another receiving terminal to which the packet needs to be relayed, to the another receiving terminal; a receiving terminal receiving section that receives a reply packet sent from the another receiving terminal in response to the packet containing the measurement information; a round trip time information acquiring section that acquires time information about the round trip time, based on the reply packet received in the receiving terminal receiving section; and a round trip time information transmitting section that transmits to the transmitting terminal the packet containing the time information acquired in the round trip time information acquiring section; and in which the transmitting terminal comprises: a transmitting terminal receiving section that receives the packet containing the time information from the receiving terminal; a round trip time acquiring section that calculates the round trip time from the packet received in the transmitting terminal receiving section; a selection section that selects one of round trip times calculated in the round trip time acquiring section, based on a predetermined reference; and a calculation section that calculates a transmission rate of the packet, based on the round trip time selected in the selection section.

Advantageous Effect of the Invention

The present invention provides an advantage of improving the performance of packet transmission significantly without calculating RTT as a large value even while concatenated transfer is carried out.

BEST MODE FOR CARRYING OUT THE INVENTION

Hereinafter, an embodiment of the present invention will be explained in detail with reference to the accompanying drawings.

Figure 2:
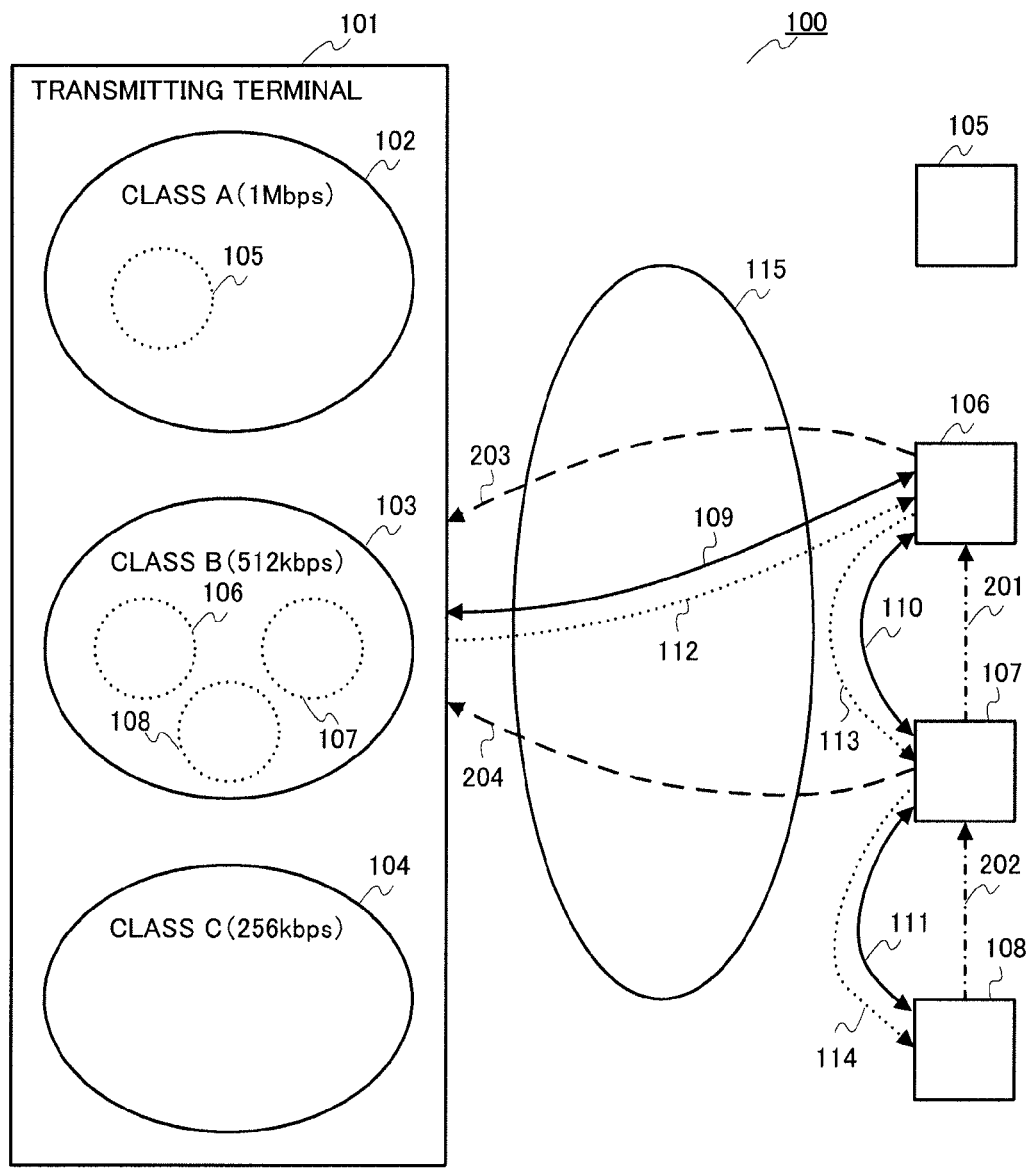
FIG. 2 is a configuration diagram illustrating an divided RTT measuring scheme of a packet transport system according to an embodiment of the present invention.

FIG. 2 is a configuration diagram of a packet transport system according to an embodiment of the present invention. The method of measuring RTT, which is the round trip time of a packet, according to the present embodiment will be explained using FIG. 2.

If affinity with TCP is maintained in the bottleneck interval about RTT measurement route, it is likely that affinity with TCP is maintained also in other intervals as well. Therefore, if a transmittable rate Xcal (hereinafter "Xcal-N") in the bottleneck interval of the RTT measurement route can be calculated, it is possible to avoid flow control from being performed at an unnecessarily low rate.

From the above explanation of equation 1, when calculating Xcal-N, the parameters varying from one interval to another are RTT "R" and the loss event rate "p". As for the loss event rate p, since most packet losses occur in the bottleneck interval, it is highly likely that the loss event rate p over the entire interval may be close to the loss event rate p of the bottleneck interval. On the other hand, since R is a simple addition of the RTTs of individual intervals, if the concatenated route grows longer, the RTT of the bottleneck interval (hereinafter "RTT-N") is anticipated to increase unnecessarily.

Therefore, when the RTT-N of the bottleneck interval is calculated and Xcal-N is calculated using this RTT-N as R, even if the same measured value as that during concatenation is used for other parameters such as the loss event rate p, a significant effect can be expected from a practical standpoint. Therefore, the present embodiment will adopt an RTT measurement method whereby RTT is measured by terminating RTT measurement every relaying receiving terminal (hereinafter "divided RTT measurement").

Packet transport system 100 shown in FIG. 2 is comprised of transmitting terminal 101, receiving terminals 105 to 108 and Internet 115.

Figure 1:
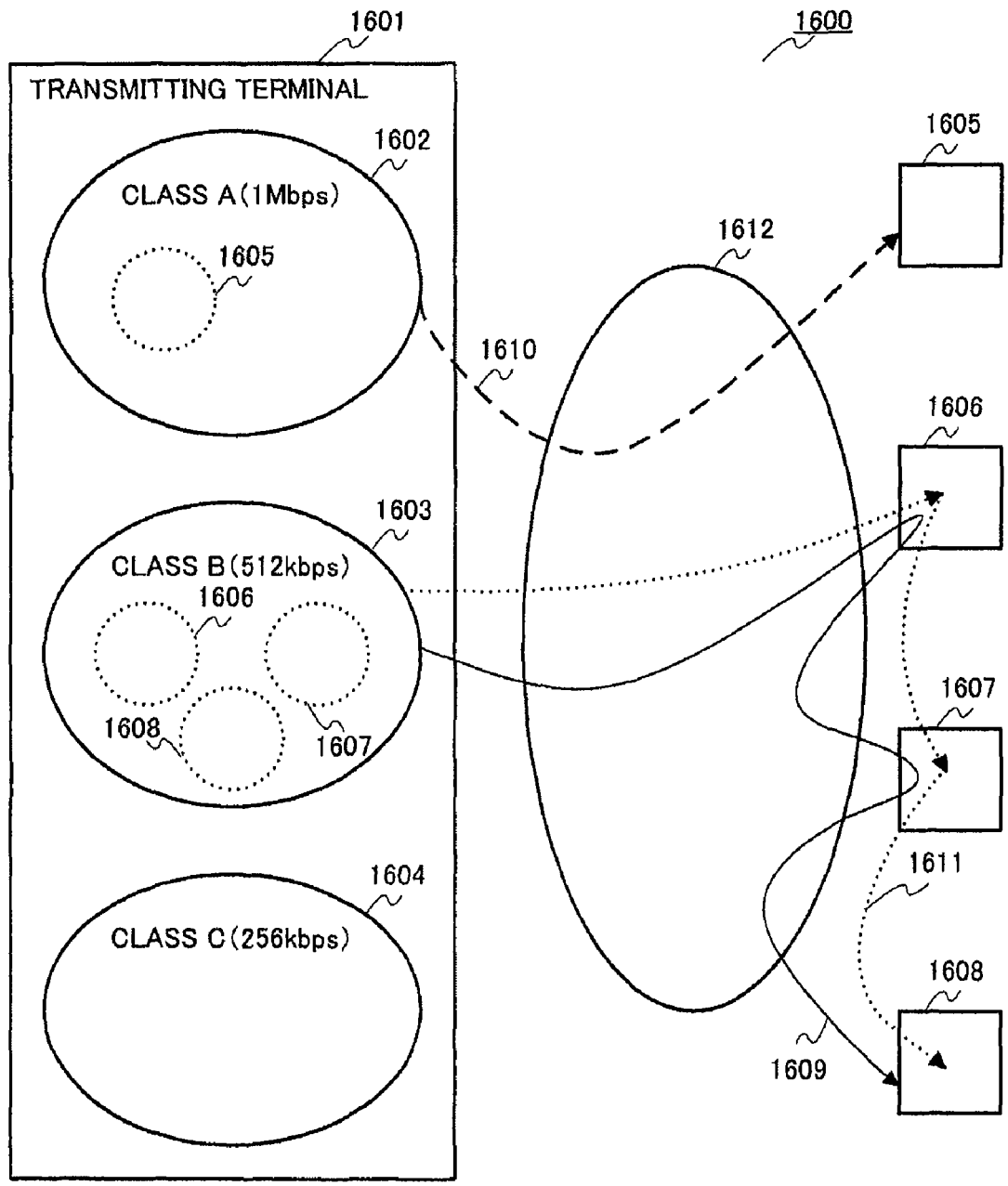
FIG. 1 illustrates a conventional SICC scheme.

As explained with the prior art in FIG. 1, transmitting terminal 101 in FIG. 2 includes class A102 having a transmission rate of 1 Mbps, class B103 having a transmission rate of 512 Kbps and class C104 having a transmission rate of 256 Kbps, which are SICC-based classes. Suppose receiving terminal 105 belongs to class A102, receiving terminals 106 to 108 belong to class B103 and no receiving terminal corresponds to class C104.

The present embodiment will explain a case where transmitting terminal 101 delivers data to receiving terminals 106 to 108 belonging to class B103. The same is applicable to cases where transmitting terminal 101 delivers data to receiving terminals belonging to other classes likewise.

RTT measurement route 109 shows the route upon measurement of RTT between transmitting terminal 101 and receiving terminal 106. RTT measurement route 110 shows the route upon measurement of RTT between receiving terminal 106 and receiving terminal 107. RTT measurement route 111 shows the route upon measurement of RTT between receiving terminal 107 and receiving terminal 108.

Data delivery route 112 is the route to first receiving terminal 106 adjoining transmitting terminal 101, on which an XCAST packet directed to three receiving terminals 106 to 108 is delivered from transmitting terminal 101. Data delivery route 113 is the route the XCAST packet directed to three receiving terminals 106 to 108 and delivered to above-described receiving terminal 106 is delivered to receiving terminal 107 adjoining receiving terminals 106 in a concatenated manner. Likewise, data delivery route 114 is the route the XCAST packet delivered to receiving terminal 107 is delivered to receiving terminal 108 adjoining receiving terminal 107 in a concatenated manner. That is, according to the present embodiment, transmitting terminal 101 and receiving terminals 106 to 108 are not physically adjoining each other but have their packet delivery routes adjoin each other. To be more specific, with regard to packet delivery, receiving terminal 106 adjoins transmitting terminal 101, receiving terminal 107 adjoins receiving terminal 106 and receiving terminal 108 adjoins receiving terminal 107.

As shown in FIG. 2, the present embodiment illustrates an example where the SICC scheme is applied to the XCAST scheme, but this case is different from the conventional configuration in that RTT measurement is terminated per individual receiving terminal 106 and 107 that relays packet delivery. That is, in FIG. 2, transmitting terminal 101 delivers a packet to receiving terminals 106 to 108 belonging to class B103 by the XCAST scheme along respective data delivery routes 112 to 114. That is, a packet delivered from transmitting terminal 101 is delivered to receiving terminal 108 via adjoining receiving terminals 106 and 107 in a concatenated manner. According to the present embodiment, RTT measurement is performed along RTT measurement routes 109 to 111 respectively in this case, and is terminated at receiving terminal 106 and at receiving terminal 107 that relay packet delivery.

Reply route 201 is the route to return RTT measurement information for use in RTT measurement such as a time stamp from receiving terminal 107, to receiving terminal 106. Reply route 202 is likewise the route to return RTT measurement information from receiving terminal 108 to receiving terminal 107. Reporting route 203 is the route to report RTT information about RTT such as the RTT measured between receiving terminal 106 and receiving terminal 107, from receiving terminal 106 to transmitting terminal 101. Reporting route 204 is likewise the route to report RTT information about the RTT measured between receiving terminal 107 and receiving terminal 108, from receiving terminal 107 to transmitting terminal 101.

Transmitting terminal 101 then selects and employs the maximum RTT among the measured RTTs sent along reporting routes 203 and 204, as the RTT to use to estimate a transmittable rate.

Thus, the present embodiment adopts divided RTT measurement. Hereinafter, divided RTT measurement will be explained.

First, a divided RTT measurement sequence between a receiving terminal and a transmitting terminal according to the present embodiment will be explained.

Figure 3:
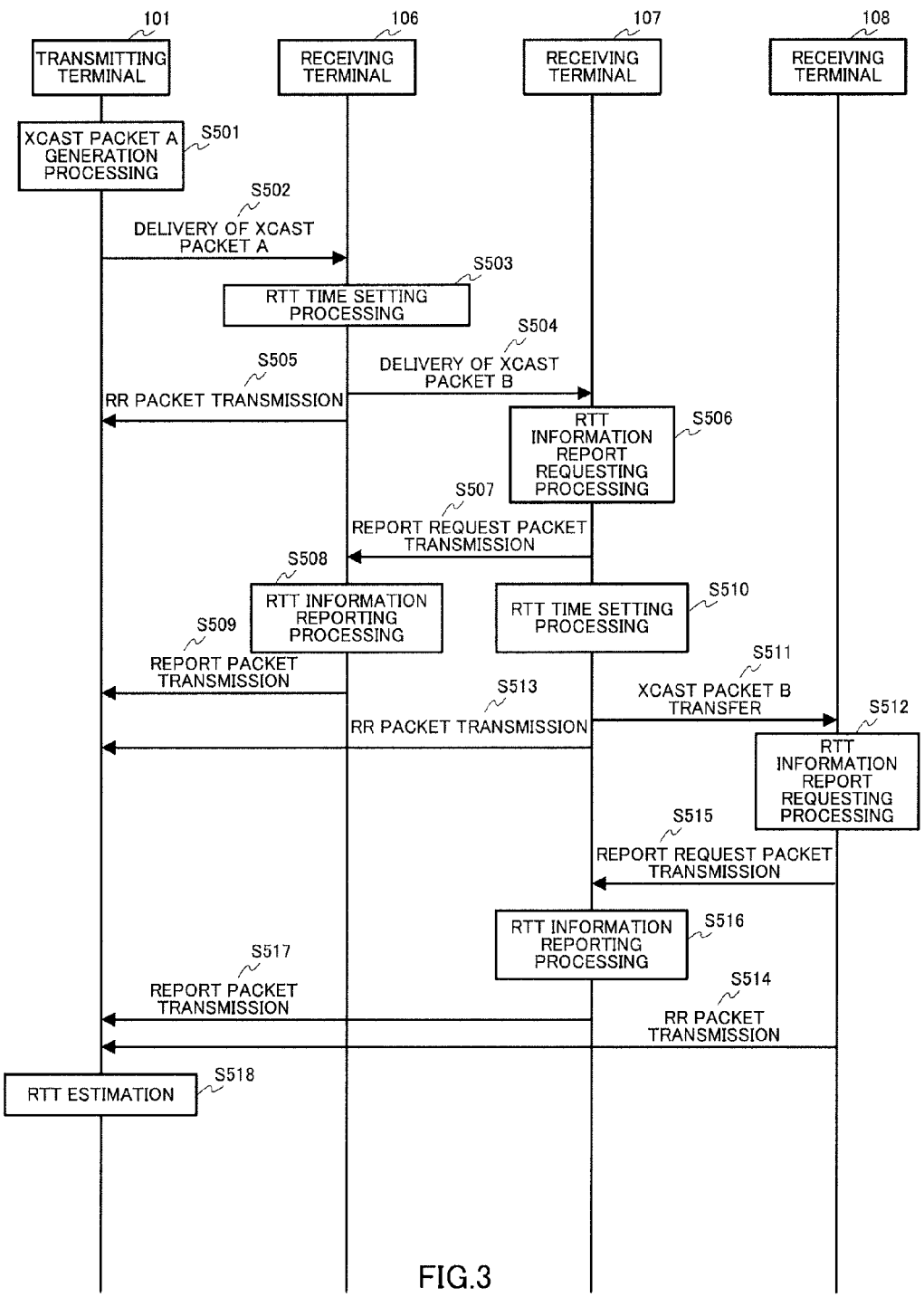
FIG. 3 is a sequence chart showing a flow of divided RTT measuring processing of the packet transport system according to the embodiment of the present invention.

FIG. 3 shows a sequence of divided RTT measurement processing according to the present embodiment.

First, transmitting terminal 101 generates a multi-destination packet (hereinafter "XCAST packet") having a header including data to be delivered and a list of delivery destinations (receiving terminals 106 to 108 in the present embodiment) (S501). The XCAST packet has two schemes as will be described later, and the present embodiment refers to the XCAST packets of these schemes as "XCAST packet A" and "XCAST packet B." In this step S501, an XCAST packet A is generated.

After having generated the XCAST packet A, transmitting terminal 101 delivers the XCAST packet A whose delivery destinations are receiving terminals 106 to 108 to receiving terminal 106 via data delivery route 112 in FIG. 2 (S502).

Here, the structure of the XCAST packet A generated at transmitting terminal 101 will be explained.

Figure 4:
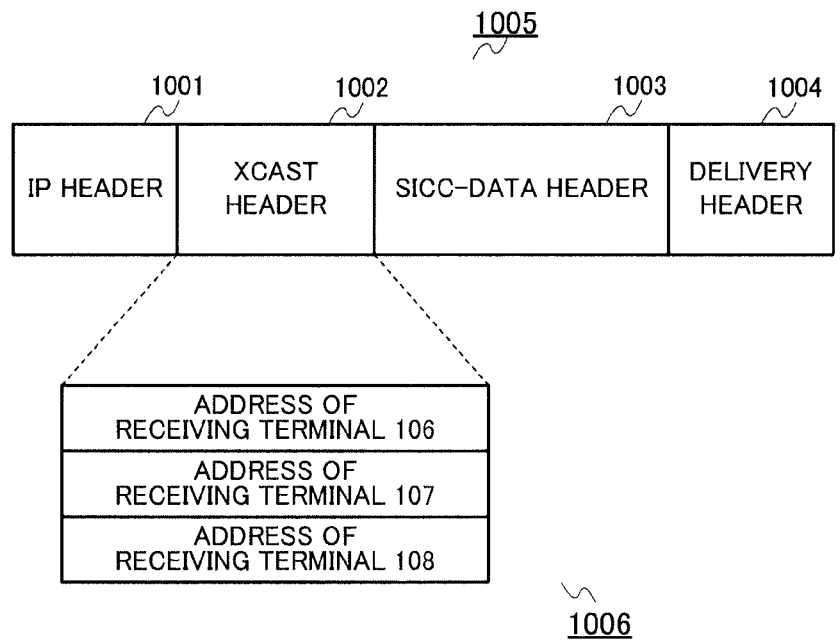
FIG. 4 illustrates a configuration of an XCAST packet A according to the embodiment.

FIG. 4 shows the configuration of the XCAST packet A according to the present embodiment.

As shown in FIG. 4, XCAST packet A1005 is comprised of IP header 1001, XCAST header 1002, SICC-DATA header 1003 and delivery data 1004.

Here, IP header 1001 is the field to store, for example, an IP header of IPv6, defined in RFC 2460. XCAST header 1002 is an field storing the XCAST header defined in the Internet draft "draft-ooms-xcast-basic-spec-09.txt." According to the present embodiment, XCAST header 1002 stores the IP addresses of receiving terminals 106 to 108 as shown in destination list 1006 in FIG. 4. SICC-DATA header 1003 is an field storing items defined to be necessary when data is delivered by the SICC scheme. For example, SICC-DATA header 1003 stores a data type indicating the data format, presence/absence of a divided RTT measurement request and transmission time or the like. Delivery data 1004 is an field storing the delivery data stored in transmitting terminal 101.

Next, upon receiving the XCAST packet A, receiving terminal 106 performs divided measuring RTT time setting processing as pre-processing for divided RTT measurement (step S503 in FIG. 3). That is, in step S503, receiving terminal 106 acquires the identifier of receiving terminal 107, which is the next transfer destination to which receiving terminal 106 should relay the packet, from destination list 1006 of XCAST packet A1005 first. Furthermore, receiving terminal 106 acquires a command as to whether or not it is necessary to report the divided measurement to transmitting terminal 101 from the value set in a predetermined field of SICC-DATA header 1003 of XCAST packet A1005. For example, as will be described later, SICC-DATA header 1003 of XCAST packet A1005 has a report request flag indicating a command as to whether or not divided measurement needs to be reported. When, for example, a bit is set in this report request flag, receiving terminal 106 decides it necessary to perform divided measurement and report the result to transmitting terminal 101. Upon acquiring a command to the effect that divided measurement is necessary, receiving terminal 106 appends its own IP address and a relay time stamp of the current time at which the XCAST packet A was received, to XCAST packet A1005 and generates an XCAST packet B.

Figure 5:
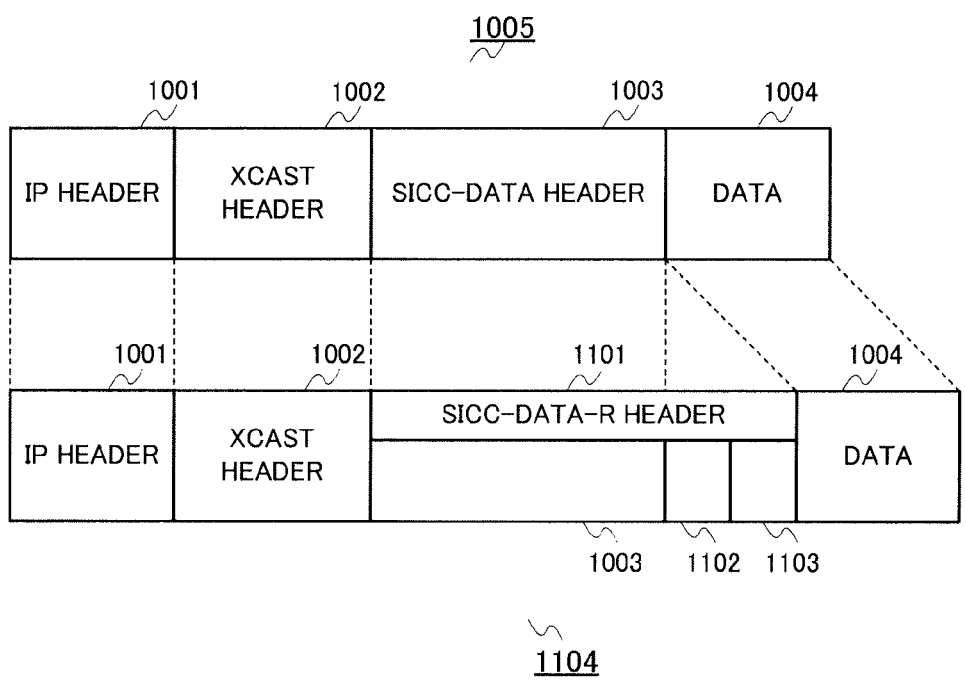
FIG. 5 illustrates a configuration of an XCAST packet B according to the embodiment.

FIG. 5 shows the configuration of the XCAST packet B according to the present embodiment and shows the XCAST packet B and XCAST packet A1005 side by side. Since the configuration of XCAST packet A1005 is the same as that in FIG. 4, explanations thereof will be omitted.

In FIG. 5, XCAST packet B1104 corresponds to XCAST packet A1005 subjected to RTT time setting processing as described above, and adopts a configuration with SICC-DATA header 1003 of XCAST packet A1005 changed to SICC-DATA-R header 1101. Here, SICC-DATA-R header 1101 results from appending relay IP address 1102 and relay time stamp 1103 to the data stored in SICC-DATA header 1003.

Next, receiving terminal 106 transfers the XCAST packet B generated above to receiving terminal 107 via data delivery route 113 shown in FIG. 2 (step S504 in FIG. 3).

Next, receiving terminal 106 transmits a receive report packet (hereinafter "RR packet"), which is used by transmitting terminal 101 to find the RTT between transmitting terminal 101 and receiving terminal 106, to transmitting terminal 101 (S505). The RR packet stores the time stamp, which is the time transmitting terminal 101 transmitted the packet, as well as the performance band and loss event rate measured in receiving terminal 106 or the like. This allows transmitting terminal 101 to calculate the RTT between transmitting terminal 101 and receiving terminal 106 from the difference between the time the RR packet was received and the time indicated by the time stamp.

Next, receiving terminal 107 having received the XCAST packet B performs RTT information report requesting processing of generating a report request packet (step S506 in FIG. 3). The report request packet generated here is intended to cause receiving terminal 106 to measure an RTT and report the measurement result to transmitting terminal 101. The report request packet includes the IP address of transmitting terminal 101 indicating the report destination and the relay time stamp included in the XCAST packet B that receiving terminal 107 received from receiving terminal 106.

Next, receiving terminal 107 transmits the report request packet generated in step S506 to the IP address of upstream receiving terminal 106, which is the data transfer source (S507).

Next, receiving terminal 106 measures an RTT and performs RTT information reporting processing to report the result to transmitting terminal 101 (S508). That is, upon receiving the report request packet from downstream receiving terminal 107, receiving terminal 106 measures RTT, which is the round trip time between receiving terminal 106 and receiving terminal 107, from the difference between the relay time stamp stored in the received report request packet and the current time of receiving terminal 106. Receiving terminal 106 then stores the RTT measured in this way in a report packet whose structure will be described later.

Next, receiving terminal 106 transmits the report packet storing RTT information such as the measured RTT, to transmitting terminal 101 (S509).

In this way, transmitting terminal 101 receives the report packet from receiving terminal 106, and can thereby calculate the RTT of data delivery route 113 between receiving terminal 106 and receiving terminal 107 resulting from dividing the delivery route of the XCAST packet.

Next, receiving terminal 107 having performed the RTT information report requesting processing in step S506 performs RTT time setting processing on the XCAST packet B in the same way as in step S503 in the case of receiving terminal 106 (S510). Receiving terminal 107 then transfers the XCAST packet B whose contents have been rewritten, to receiving terminal 108, which is the next data transfer destination (S511).

Furthermore, receiving terminal 107 transmits an RR packet to transmitting terminal 101 in the same way as the processing by receiving terminal 106 in step S505 (S513).

Next, receiving terminal 108 having received the XCAST packet B from receiving terminal 107 performs RTT information report requesting processing in the same way as the processing by receiving terminal 107 in step S506 (S512). That is, as with receiving terminal 107, receiving terminal 108 stores the IP address of transmitting terminal 101 and the relay time stamp of the XCAST packet B that receiving terminal 108 received from receiving terminal 107 in a report request packet.

After that, receiving terminal 108 transmits the report request packet to receiving terminal 107 (S515).

As in the case of the processing by receiving terminal 106 in step S508, receiving terminal 107 having received the report request packet calculates the RTT on data delivery route 114 between receiving terminal 107 and receiving terminal 108, and performs RTT information reporting processing (S516). Receiving terminal 107 then stores the RTT measurement result in the report packet, and transmits the report packet to transmitting terminal 101 (S517).

Furthermore, after performing the RTT measurement information report requesting processing in step S512, receiving terminal 108 also transmits an RR packet, which will be described later, to transmitting terminal 101 (S514).

In this way, transmitting terminal 101 receives the report packets from receiving terminal 107 and receiving terminal 108, and can thereby acquire the RTT on data delivery route 114 between receiving terminal 107 and receiving terminal 108 resulting from dividing the delivery route of the XCAST packet.

As described above, transmitting terminal 101 receives the report packets from receiving terminals 106 and 107. This allows transmitting terminal 101 to find the RTT of data delivery route 112 between transmitting terminal 101 and receiving terminal 106, the RTT of data delivery route 113 between receiving terminal 106 and receiving terminal 107 and the RTT of data delivery route 114 between receiving terminal 107 and receiving terminal 108. Transmitting terminal 101 performs processing of estimating the maximum RTT from the plurality of RTTs found in this way as the RTT value to employ to estimate a transmittable rate (S518).

Transmitting terminal 101 calculates the transmission rate based on the TFRC scheme using the RTT estimated in step S518 above and the values stored in the performance band and the loss event rate respectively included in the RR packet measured for each of receiving terminals 106 to 108 and performs flow control.

That is, when calculating a transmission rate based on the TFRC scheme, the present embodiment divides the RTT measured using the conventional scheme and adopts the maximum RTT from the divided RTTs as R in equation 1. Therefore, R according to the present embodiment is smaller than that of the conventional scheme, and as a result, the transmittable rate Xcal is greater than the conventional value, making it possible to drastically improve the performance of data transmission.

The detailed configuration and operations of transmitting terminal 101 and receiving terminal 106 in the sequence of divided RTT measurement processing according to the present embodiment explained above will be explained in detail using the specific structure of an XCAST packet transferred between the terminals.

First, the configurations of transmitting terminal 101 and receiving terminal 106 according to the present embodiment will be explained in detail.

Figure 6:
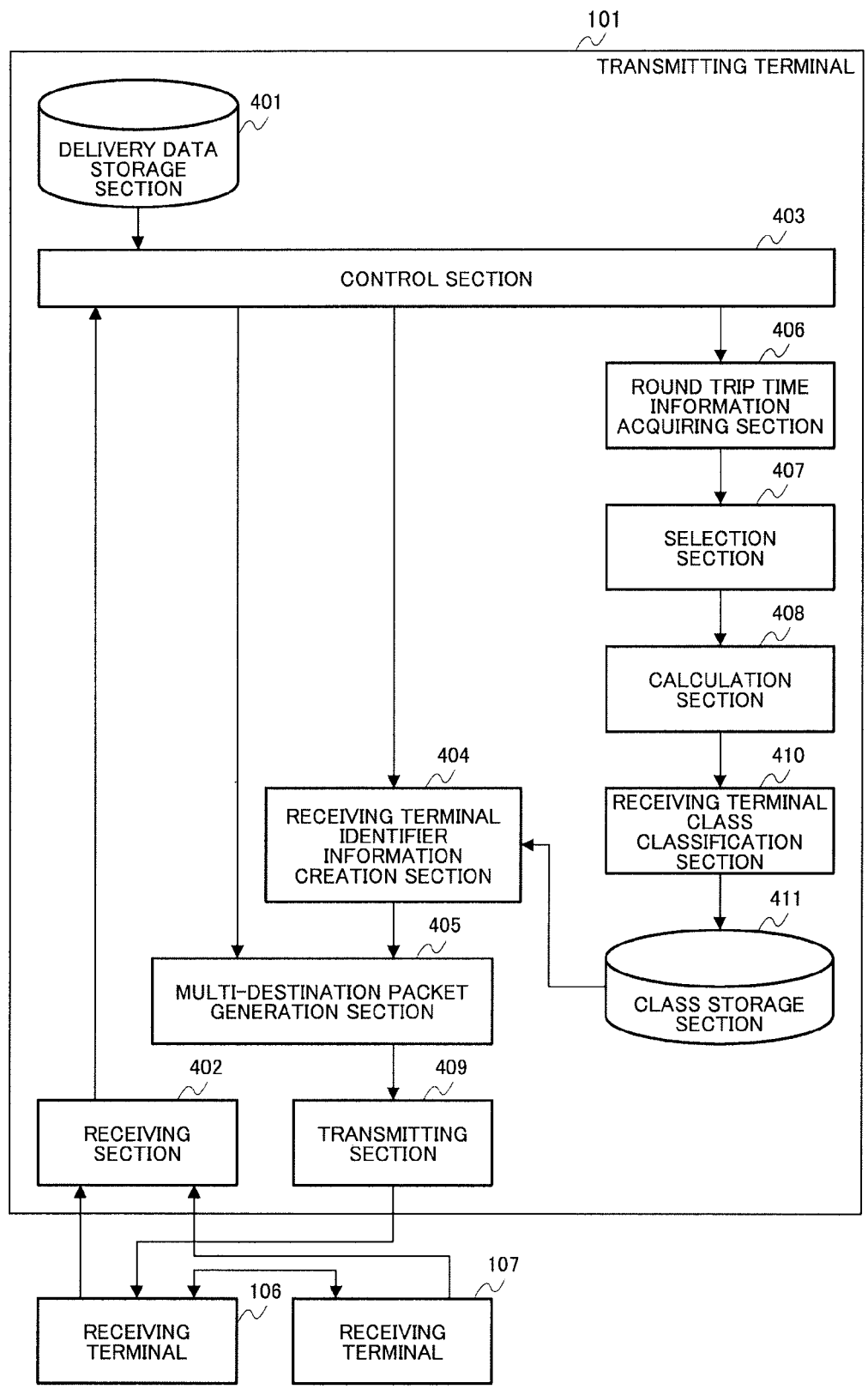
FIG. 6 is a configuration diagram showing a configuration of a transmitting terminal according to the embodiment.

FIG. 6 is a configuration diagram showing the configuration of transmitting terminal 101 according to the present embodiment.

Transmitting terminal 101 is comprised of delivery data storage section 401, receiving section 402, control section 403, receiving terminal identifier information creation section 404, multi-destination packet generation section 405, round trip time information acquiring section 406, selection section 407, calculation section 408, transmitting section 409, receiving terminal class classification section 410 and class storage section 411.

Delivery data storage section 401 stores delivery data such as video content to be delivered to receiving terminals 106 to 108. Receiving section 402 receives report packets storing RTT information and RR packets, which will be described later, from receiving terminals 106 to 108, and also receives delivery destination information such as IP address and content information or the like. Receiving terminal identifier information creation section 404 creates delivery destination information, which are the identifiers of receiving terminals 106 to 108 to which the delivery data stored in delivery data storage section 401 is delivered. This delivery destination information is, for example, the IP addresses of receiving terminals 106 to 108. Multi-destination packet generation section 405 adds the delivery destination information generated in receiving terminal identifier information creation section 404 to the delivery data stored in delivery data storage section 401, and generates a multi-destination packet to be delivered to multiple points.

Round trip time information acquiring section 406 acquires the RTTs from the report packets storing RTT information from receiving terminals 106 to 108 received in receiving section 402 respectively. Selection section 407 selects a predetermined RTT based on a predetermined reference from the RTTs acquired in round trip time information acquiring section 406. As for the predetermined reference, with the present embodiment, selection section 407 selects, for example, the maximum RTT from a plurality of RTTs obtained. However, in addition to this, the second maximum RTT or the third maximum RTT may also be selected if these RTTs are effective to reduce Xcal in equation 1. Whether or not RTT is effective to reduce Xcal can be decided by, for example, comparing the Xcal calculated using equation 1 with a predetermined value. When the RTT temporarily increases to an extreme value depending on the network situation, it is possible to prevent this RTT from being selected in this way. Alternatively, a plurality of RTTs may be divided into several groups and an arbitrary one may be adopted from the RTTs belonging to a maximum group. These conditions may also be changed according to the situation of data delivery on each occasion. Calculation section 408 calculates a transmission rate for each receiving terminal based about RTT selected in selection section 407. Transmitting section 409 transmits the multi-destination packet generated in multi-destination packet generation section 405 to first receiving terminal 106.

Receiving terminal class classification section 410 classifies receiving terminals 105 to 108 into classes of appropriate transmission rates, class A102 to class C104 in the present embodiment, based on the transmission rates for the receiving terminals calculated in calculation section 408. Class storage section 411 stores the results classified by receiving terminal class classification section 410 in association with class A102 to class C104 and receiving terminals 105 to 108 belonging thereto. The present embodiment explains the operations after receiving terminal class classification section 410 classifies terminals into classes and class storage section 411 stores the associations between classes A102 to C104 and receiving terminals 105 to 108.

Furthermore, receiving terminal identifier information creation section 404 creates delivery destination information based on the classifications of the receiving terminals recorded in class storage section 411, and hands over the delivery destination information to multi-destination packet generation section 405. Transmitting section 409 transmits the multi-destination packet generated by multi-destination packet generation section 405 based on the delivery destination information created in receiving terminal identifier information creation section 404. Control section 403 controls the operations of the sections explained so far triggered by delivery of data, reception of a report packet or the like.

Figure 7:
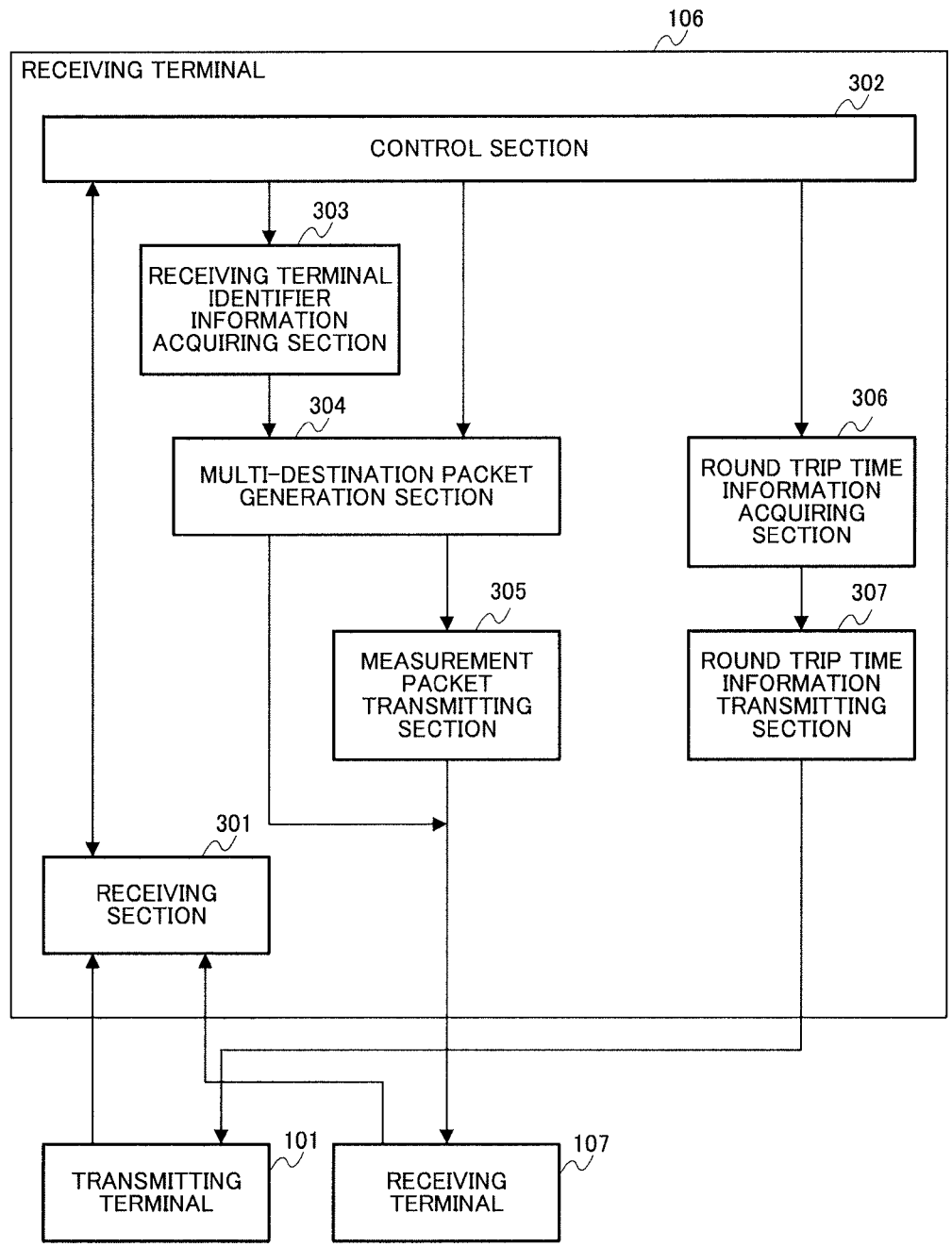
FIG. 7 is a configuration diagram showing a configuration of a receiving terminal according to the embodiment.

FIG. 7 is a configuration diagram showing the configuration of the receiving terminal according to the present embodiment.

Receiving terminal 106 is comprised of receiving section 301, control section 302, receiving terminal identifier information acquiring section 303, multi-destination packet generation section 304, measurement packet transmitting section 305, round trip time information acquiring section 306 and round trip time information transmitting section 307.

Receiving section 301 receives a report request packet from transmitting terminal 101 or receiving terminal 107, which is the next transfer destination. Receiving terminal identifier information acquiring section 303 acquires the identifier of the next receiving terminal, to which the XCAST packet received in receiving section 301 needs to be transferred. Here, suppose receiving terminal identifier information acquiring section 303 acquires the IP address of the receiving terminal as the identifier of the receiving terminal. Multi-destination packet generation section 304 performs processing on the XCAST packet received in receiving section 301 to relay the packet to receiving terminal 107 to which the packet needs to be transferred next. To be more specific, multi-destination packet generation section 304 performs required processing on the header of the XCAST packet such as recording that its own address has already been delivered. Measurement packet transmitting section 305 adds RTT measurement information necessary to measure the RTT between 106 and receiving terminal 107, which is the next transfer destination, to the XCAST packet subjected to required processing in multi-destination packet generation section 304 and transmits the XCAST packet to receiving terminal 107. Round trip time information acquiring section 306 receives a reply to the packet, to which RTT measurement information necessary to measure the RTT is added and which is transmitted from measurement packet transmitting section 305, from receiving terminal 107 in receiving section 301 and calculates RTT information. The RRT information includes, for example, the RTT between receiving terminal 106 and receiving terminal 107. Round trip time information transmitting section 307 transmits the packet storing the RTT information calculated in round trip time information acquiring section 306 to transmitting terminal 101 as the report packet. Control section 302 controls the operations of the sections described above triggered by reception of a packet from transmitting terminal 101 or the like. Receiving terminal 105, receiving terminal 107 and receiving terminal 108 in the present embodiment each have the same configuration as that of receiving terminal 106.

Processing of main parts in the sequence diagram of the present embodiment shown in FIG. 3 will be explained using FIGS. 8 to 16 with reference to FIG. 6 and FIG. 7.

Figure 8:
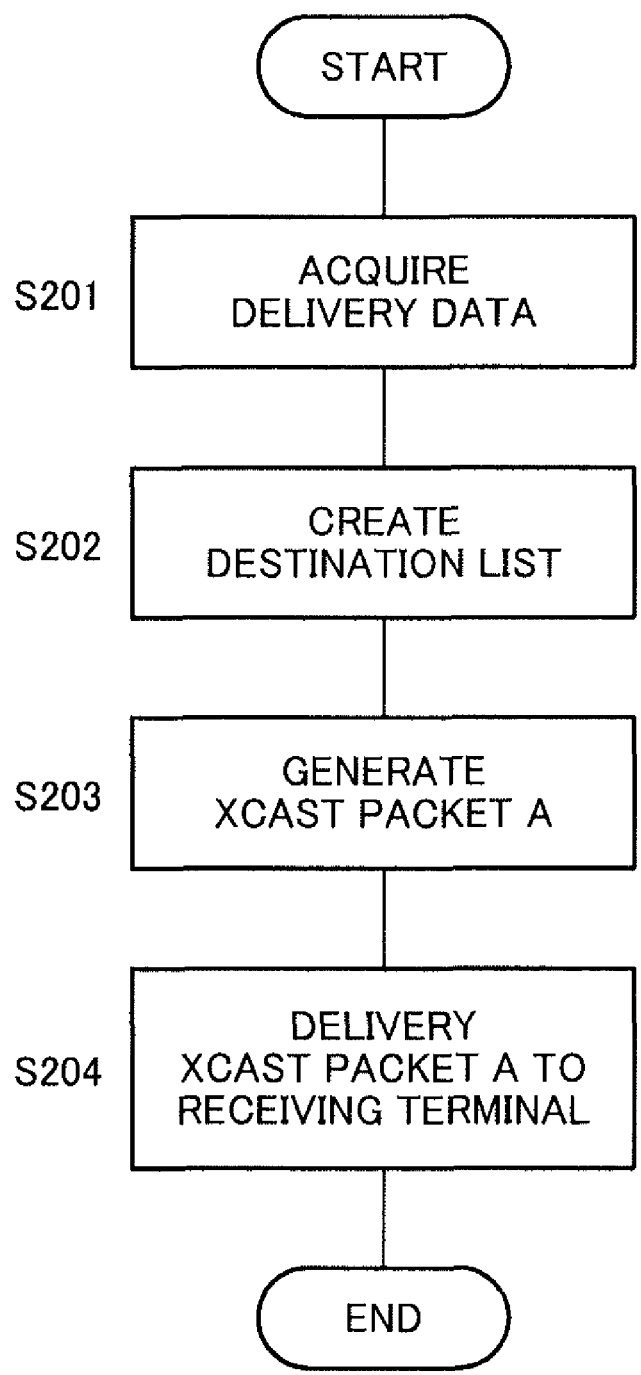
FIG. 8 is a flowchart showing a flow of XCAST packet generation processing according to the embodiment.

FIG. 8 is a flowchart showing the details of the XCAST packet generation processing (S501) in transmitting terminal 101 in the sequence diagram shown in FIG. 3. Here, suppose step S502 of FIG. 3 will be handled as part of the XCAST packet generation processing for ease of explanation.

Transmitting terminal 101 acquires data to be delivered from delivery data storage section 401 via control section 403 (S201). Control section 403 has the IP addresses or the like of receiving terminals requesting the acquisition of this data registered in advance. For example, when delivery data storage section 401 stores content information about IP television, control section 403 can acquire and register the IP addresses of receiving terminals requesting delivery from the Web server providing an IP program table or the like.

Next, receiving terminal identifier information creation section 404 creates a list of delivery destinations (i.e. delivery destination list) to which data is delivered (S202). For example, receiving terminal identifier information creation section 404 creates the destination list using the IP addresses of receiving terminals registered as described above. According to the present embodiment, receiving terminal identifier information creation section 404 creates a destination list describing the IP addresses of receiving terminals 106 to 108. Next, multi-destination packet generation section 405 adds the delivery destination information generated in receiving terminal identifier information creation section 404 to the delivery data stored in delivery data storage section 401, and creates XCAST packet A1005, which is a delivery packet having the structure shown in FIG. 4 (S203).

Next, transmitting section 409 delivers XCAST packet A1005 created in multi-destination packet generation section 405 along data delivery route 112 in FIG. 2 (S204).

Next, the RTT time setting processing (S503) in FIG. 3 will be explained.

The RTT time setting processing is also performed by receiving terminal 107 in step S510 of FIG. 3. The difference between the processing in step S503 and the processing in step S510 is whether the XCAST packet handled is XCAST packet A1005 or XCAST packet B1104, and therefore both cases of processing will be explained together.

Figure 9:
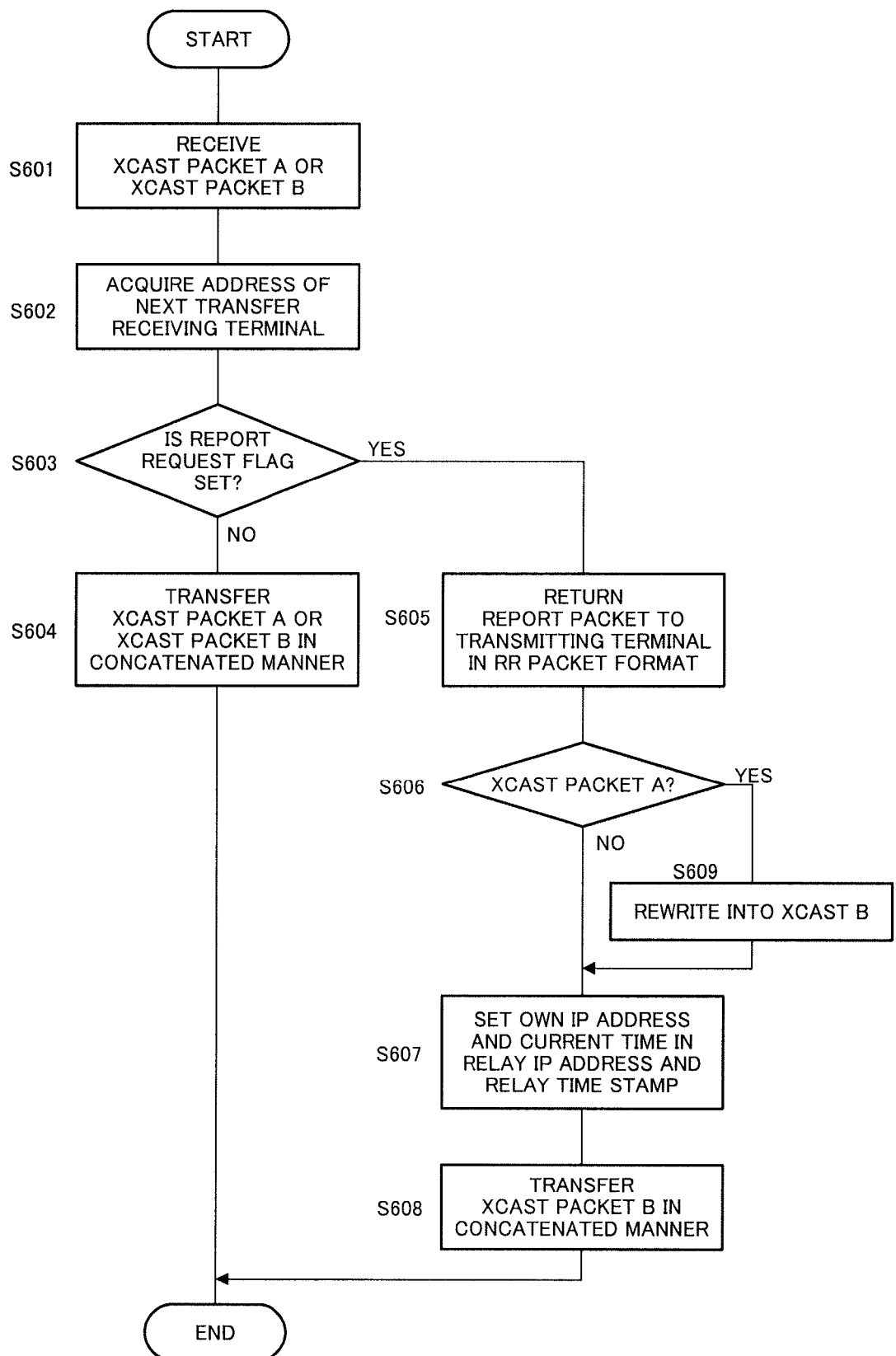
FIG. 9 is a flowchart showing a flow of RTT time appending processing according to the embodiment.

FIG. 9 is a flowchart showing the flow of RTT time appending processing. Here, suppose steps S504, S505, S511 and S513 in FIG. 3 will be handled as part of the RTT time appending processing for ease of explanation.

Receiving section 301 receives XCAST packet A1005 from transmitting terminal 101 in the case of receiving terminal 106 or receives XCAST packet B1104 from receiving terminal 106 in the case of receiving terminal 107 (S601). Next, receiving terminal identifier information acquiring section 303 acquires the receiving terminal identifier of the next transfer destination for which the receiving terminal should relay from destination list 1006 of XCAST header 1002 of received XCAST packet A1005 in the case of receiving terminal 106 or destination list 1006 of XCAST header 1002 of XCAST packet B1104 in the case of receiving terminal 107 (S602). The present embodiment acquires the IP address of receiving terminal 107 in the case of receiving terminal 106 or the IP address of receiving terminal 108 in the case of receiving terminal 107.

Figure 10:
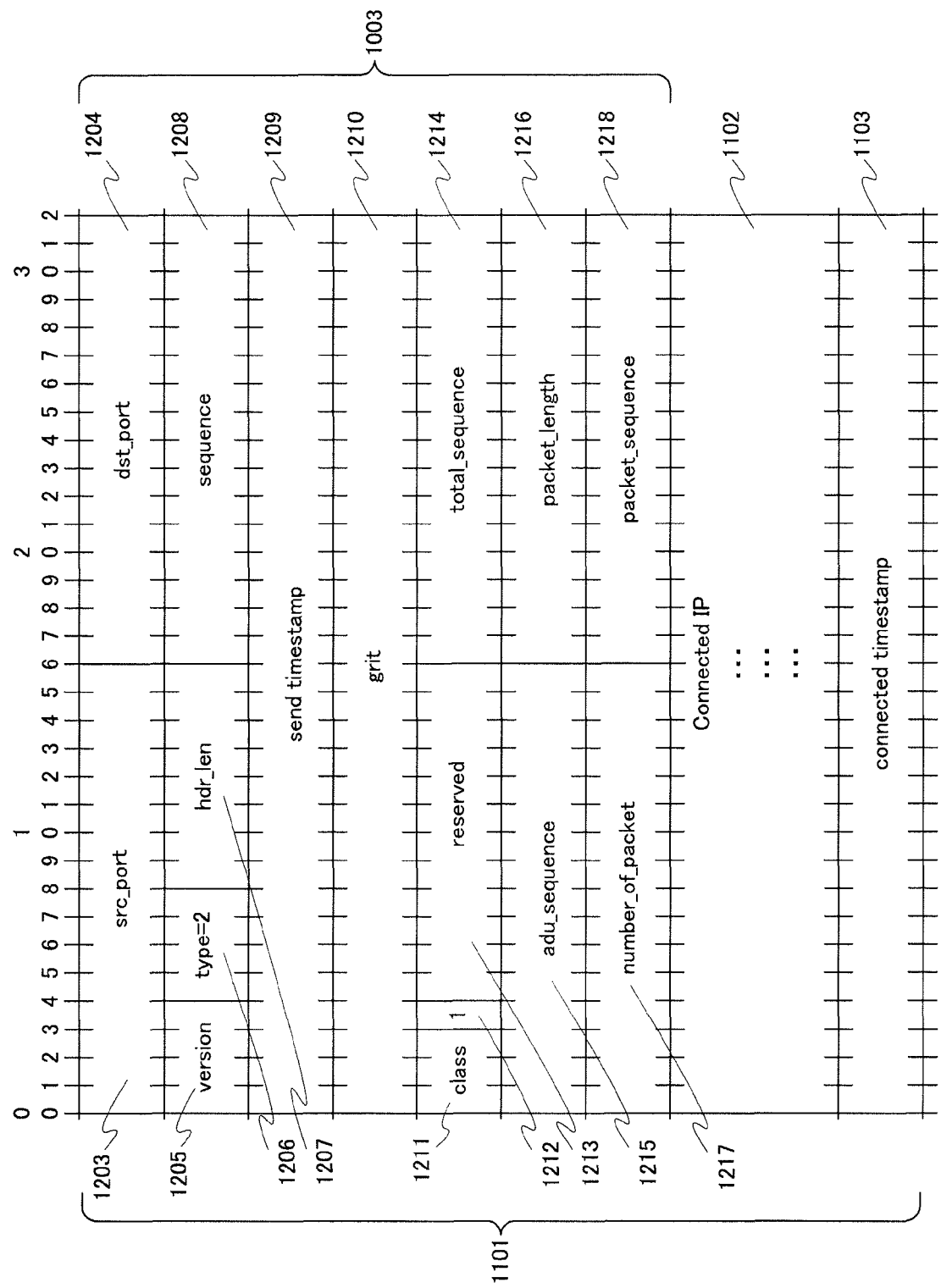
FIG. 10 illustrates a configuration of an SICC-DATA-R header according to the embodiment.

Next, control section 302 decides whether or not the bit of report request flag 1212 of SICC-DATA header 1003 shown in FIG. 10 is set in received XCAST packet A1005 in the case of receiving terminal 106 or in XCAST packet B1104 in the case of receiving terminal 107 (S603). Report request flag 1212 is a flag to represent a command as to whether or not the aforementioned divided measurement needs to be reported, and, when a bit is set in this flag, receiving terminals 106 and 107 perform divided measurement and reports the result to transmitting terminal 101. The present embodiment assumes that the bit is set in report request flag 1212 as shown in FIG. 10. The configuration of SICC-DATA header 1003 will be explained later using FIG. 10.

When report request flag 1212 is not set in step S603 (S603: NO), multi-destination packet generation section 304 rewrites XCAST packet A1005 in the case of receiving terminal 106 or XCAST packet B1104 in the case of receiving terminal 107 according to the XCAST scheme. This causes multi-destination packet generation section 304 to generate a packet to be transferred to receiving terminal 107 of the next transfer destination in the case of receiving terminal 106 or generate a packet to be transferred to receiving terminal 108 of the next transfer destination in the case of receiving terminal 107, and carries out concatenated transfer (S604).

When report request flag 1212 is set in step S603 (S603: YES), control section 302 returns an RR packet to transmitting terminal 101 for feedback of the delivery situation (S605). Details of the structure of the RR packet will be described later.

Next, multi-destination packet generation section 304 decides whether the received packet is XCAST packet A1005 or XCAST packet B1104 (S606). This decision can be made in the field of data type 1206 in the packet stored in SICC-DATA header 1003 or SICC-DATA-R header 1101 shown in FIG. 10. According to the present embodiment, multi-destination packet generation section 304 decides the packet to be XCAST packet A1005 when the value of data type 1206 is "1" or decides the packet to be XCAST packet B1104 when the value is "2" as shown in FIG. 10. SICC-DATA header 1003 shown in FIG. 10 will be described later.

When the decision result in step S606 is XCAST packet A1005 (S606: YES), multi-destination packet generation section 304 rewrites XCAST packet A1005 into the XCAST packet B1104 format. That is, multi-destination packet generation section 304 secures the fields of relay IP address 1102 and relay time stamp 1103, further rewrites field 1206 indicating the data type to a type indicating XCAST packet B1104, "2" in the present embodiment (S609) and moves to next step S607.

When the packet received in step S606 is already XCAST packet B1104 (S606: NO), multi-destination packet generation section 304 does not perform processing of rewriting the packet into the XCAST packet B1104 format and moves to next step S607.

Next, measurement packet transmitting section 305 sets an identifier to specify the own receiving terminal on the Internet in relay IP address 1102 and sets the current time in relay time stamp 1103 for a packet in the XCAST packet B1104 format (S607). Here, measurement packet transmitting section 305 sets the own IP address in the packet in the XCAST packet B1104 format as the above-described identifier.

Finally, measurement packet transmitting section 305 transfers XCAST packet B1104 processed in such a way to the next transfer destination in a concatenated manner according to the XCAST scheme (S608). That is, measurement packet transmitting section 305 transfers XCAST packet B1104 to receiving terminal 107 in the case of receiving terminal 106 or transfers XCAST packet B1104 to receiving terminal 108 in the case of receiving terminal 107.

FIG. 10 shows a specific configuration of SICC-DATA-R header 1101 of XCAST packet B1104 processed as described above. The processing whereby the XCAST packet A is rewritten into the XCAST packet B will be explained in detail in a detailed data configuration using FIG. 10.

SICC-DATA-R header 1101 has transmission port number 1203 to packet sequential serial number 1218, relay IP address 1102 and relay time stamp 1103. Relay IP address 1102 and relay time stamp 1103 have been appended to XCAST packet A1005 in step S609 shown in FIG. 9. In this way, SICC-DATA header 1003 of XCAST packet A1005 shown in FIG. 4 and FIG. 5 corresponds to SICC-DATA-R header 1101 shown in FIG. 5 and FIG. 10 without relay IP address 1102 and relay time stamp 1103.

Transmission source port 1203 and destination port 1204 are the fields used to determine the target application to which an SICC protocol stack hands over data. Furthermore, version number 1205 is the version number, indicating the version number of the SICC protocol. Data type 1206 is the field indicating the data type that defines the packet format in the SICC protocol. For example, XCAST packet B1104 where "1" is written in this data type 1206 can be defined by the SICC protocol as the one that delivers data. In this case, as explained above, the packet whose data type 1206 is "1" can be identified as the XCAST packet A. On the other hand, as shown in FIG. 10, the packet whose data type 1206 is "2" can be identified as the XCAST packet B. Furthermore, header length 1207 stores the length of SICC-DATA header 1003. Sequence number 1208 stores the sequential serial number of a transmitted packet. Time stamp 1209 stores the time at which transmitting terminal 101 transmitted delivery data. Maximum RTT 1210 is the field where the maximum RTT between the transmitting terminal and the receiving terminal is set by the transmitting terminal. However, according to the present embodiment, transmitting terminal 101 does not use the field of maximum RTT 1210, and only calculates the maximum RTT and estimates the RTT in step S518 of FIG. 3.

Furthermore, class 1211 is the field to indicate the class classified by transmission rates explained in FIG. 2. Report request flag 1212 is the flag to indicate the presence/absence of a report request of divided measurement of RTT. For example, with the present embodiment, as described above, that report request flag 1212 is set indicates that a request for reporting divided measurement is made, whereas that the bit of report request flag 1212 is not set indicates that no request for reporting divided measurement is made. Maximum RTT 1210, reserved field 1213, total sequence 1214, ADU sequential serial number 1215, packet length 1216, number of packets 1217 and packet sequential serial number 1218 are the fields used by the SICC scheme to divide and reconstruct a packet in data delivery. Packet sequential serial number 1218 is used as a sequential serial number in a packet divided in such a way, but detailed explanations thereof will be omitted.

When the SICC-DATA-R header is configured as transmission port number 1203 to packet sequence 1218, how XCAST packet A1005 and XCAST packet B1104 are generated and how rewriting processing is performed when concatenated transfer is carried out by receiving terminal 106, will be described.

XCAST packet A1005 of the present embodiment sets data type field 1206, for example, to "1" and header length 1207 to "28" (bytes). XCAST packet B1104 sets, for example, data type field 1206 to "0x10" (16 in decimal notation) and header length 1207 to "48" (bytes). The difference of 20 bytes in the header length between XCAST packet A1005 and XCAST packet B1104 is found by assuming the length of relay IP address 1102 16 bytes and that of relay time stamp 1103 4 bytes and adding these. When delivery is performed using IPv4, the length of relay IP address 1102 can be described in 4 bytes. In this case, for example, data type field 1206 is set to "0x11" (17 in decimal notation) and header length 1207 is set to "36" (bytes).

Therefore, multi-destination packet generation section 304 of receiving terminal 106 rewrites data type 1206 and header length 1207 of XCAST packet A1005, sets the IP address as an identifier to specify receiving terminal 106 itself on the Internet in relay IP address 1102, appends the current time of receiving terminal 106 to relay time stamp 1103, and can thereby rewrite XCAST packet A1005 into XCAST packet B1104.

On the other hand, as explained in FIG. 3, when report request flag 1212 is set in SICC-DATA header 1003, receiving terminal 106 having received XCAST packet A1005 immediately transmits an RR packet containing information about time stamp 1209 to transmitting terminal 101 in step S504. By so doing, transmitting terminal 101 can measure the RTT between transmitting terminal 101 and receiving terminal 106.

Here, the RR packet transmitted from receiving terminal 106 to transmitting terminal 101 will be explained.

Figure 11:
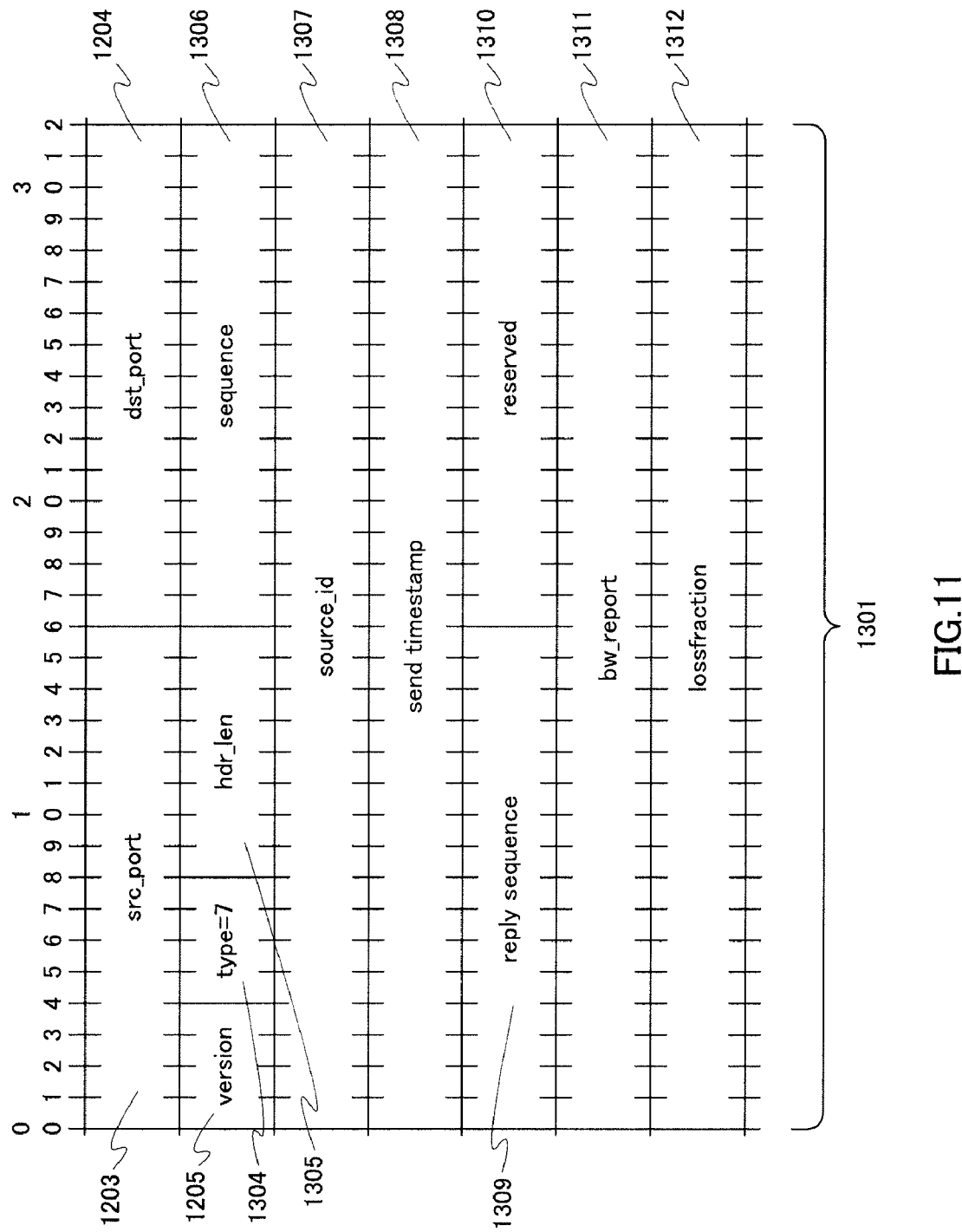
FIG. 11 illustrates a configuration of an RR packet according to the embodiment.

FIG. 11 shows a detailed configuration of the RR packet in the present embodiment.

In FIG. 11, RR packet 1301 has transmission port number 1203 to version 1205 and data type 1304 to loss event rate 1312. Transmission port number 1203 to version 1205 are the same as those of XCAST packet B shown in FIG. 10. Data type 1304 is the field showing the format of a packet. For example, by defining "7" as the RR packet format in advance, receiving terminals 105 to 108 and transmitting terminal 101 can identify RR packet 1031 from data type 1304. Furthermore, "28" (bytes), which is the length of the RR packet, is set in header length 1305. The IP address of receiving terminal 106, which is the own terminal, is stored in transmission source identifier 1307. Time stamp 1308 is the field where receiving terminal 106 transcribes time stamp 1209 described in XCAST packet A1005. Here, time stamp 1209 records the time at which transmitting terminal 101 transmits a packet.

When receiving terminal 106 returns the transmission time, transmitting terminal 101 can thereby measure the RTT between receiving terminal 106 and transmitting terminal 101. Performance band 1311 is the field to report the performance band that can be observed by the receiving terminal, and is used in the form of limiting an upper limit when a transmittable rate between the transmitting terminal 101 and the receiving terminal is calculated based on the TFRC scheme. Loss event rate 1312 is used to describe and report the loss event rate observed in the receiving terminal based on the observation scheme defined in the TFRC scheme. RR packet 1301 has packet sequential serial number 1306, reply sequence 1309 and reserved field 1310 in addition to the above-described fields.

Next, the RTT information report requesting processing (S506, S512) shown in FIG. 3 will be explained using the configuration of the report request packet. Here, step S506 will be explained as an example. Furthermore, suppose step S507 in FIG. 3 will be handled as part of the RTT information report requesting processing for ease of explanation.

Receiving terminal 107 having received XCAST packet B1104 generates a report request packet in control section 302 and performs RTT information report requesting processing. The report request packet generated in control section 302 of receiving terminal 107 will be explained.

Figure 12:
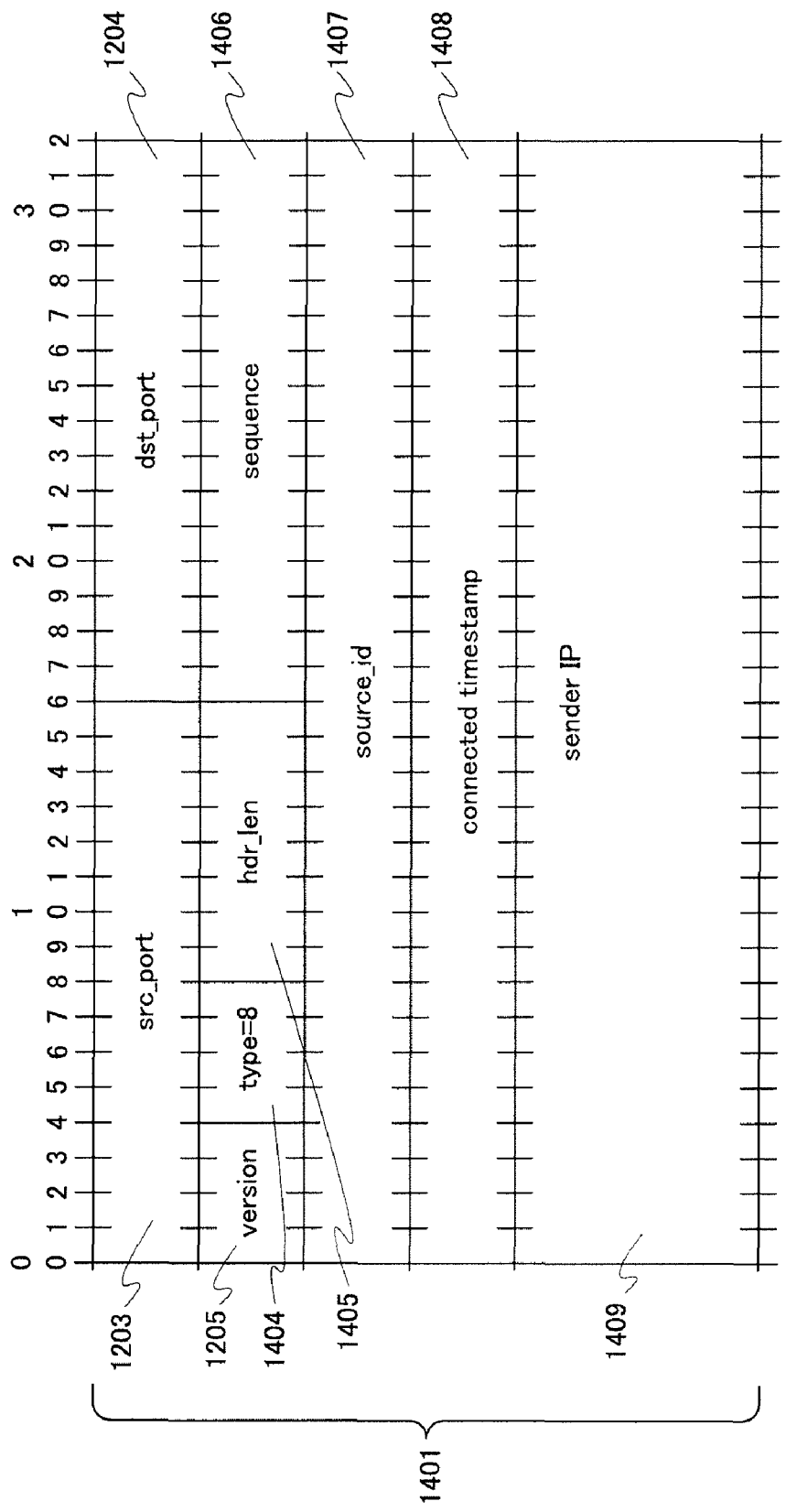
FIG. 12 illustrates a configuration of a report request packet according to the embodiment.

FIG. 12 shows a detailed configuration of the report request packet.

In FIG. 12, report request packet 1401 has transmission port number 1203 to version 1205 and data type 1404 to return destination IP address 1409. Transmission port number 1203 to version 1205 are the same as those of XCAST packet B shown in FIG. 10. Data type 1404 is the field showing the packet format. For example, defining "8" as the report request packet format in advance allows receiving terminals 105 to 108 and transmitting terminal 101 to identify report request packet 1401 from data type 1404. "32" (bytes), which is the length of the report request packet, is set in header length 1405. Transmission source identifier 1407 is the field to show information such as the IP address that specifies the transmission source of the present packet. Relay time stamp 1408 is the field for receiving terminal 107 to return the time stamp to upstream receiving terminal 106. This relay time stamp 1408 is relay time stamp 1103 of XCAST packet B1104 received from upstream receiving terminal 106 that receives data delivery and, for example, time stamp (in the case of S506) of receiving terminal 106 or time stamp (in the case of S512) of receiving terminal 107 are transcribed. Transmission destination 1409 is the field to store the destinations to which reports are transmitted, and the IP address is described as the identifier to specify transmitting terminal 101. Report request packet 1401 has packet sequential serial number 1406 in addition to the above-described fields.

Receiving terminal 107 stores the IP address of transmitting terminal 101 showing the reporting destination in transmission destination 1409 of report request packet 1401. Furthermore, receiving terminal 107 transcribes and stores the value of relay time stamp 1103 of XCAST packet B1104 received in receiving terminal 107 from receiving terminal 106 in relay time stamp 1408.

Receiving terminal 107 then returns report request packet 1401 to the IP address of upstream receiving terminal 106 as shown in step S507 of FIG. 3. Receiving terminal 106 having received report request packet 1401 calculates an RTT using the information described in time stamp 1408 and the current time, and reports the calculated RTT to the destination described in transmission destination identifier 1409, that is, transmitting terminal 101 as the report packet.

Next, the RTT information reporting processing (S508, S516) in FIG. 3 will be explained. Here, step S508 will be explained as an example. Furthermore, suppose step S509 in FIG. 3 will be handled as part of the RTT information reporting processing for ease of explanation.

Figure 13:
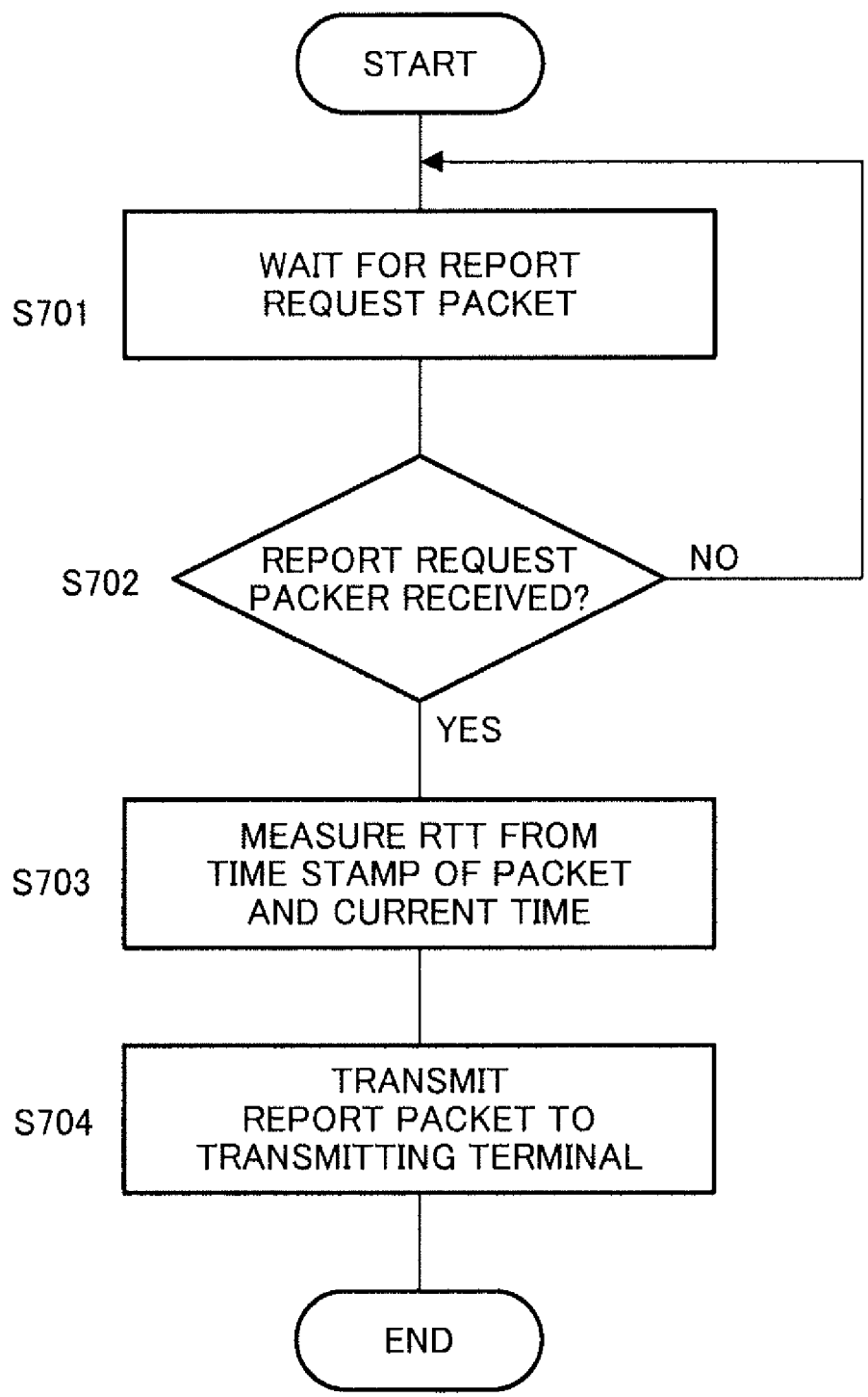
FIG. 13 is a flowchart showing a flow of RTT information reporting processing according to the embodiment.

FIG. 13 is a flowchart showing a flow of RTT information reporting processing.

After transferring XCAST packet B1104 to downstream receiving terminal 107, to which data needs to be transferred (step S504 in FIG. 3), receiving terminal 106 waits for report request packet 1401, which is a reply, through receiving section 301 (S701).

In receiving terminal 106, when receiving section 301 receives report request packet 1401 (S702: YES), control section 302 hands over report request packet 1401 received in receiving section 301 to round trip time information acquiring section 306. Round trip time information acquiring section 306 acquires information stored in relay time stamp 1408 of report request packet 1401, refers to the current time of receiving terminal 106 and thereby measures the RTT, which is the round trip time between receiving terminal 106 and receiving terminal 107, from the difference (S703).

Finally, receiving terminal 106 stores the RTT measured as shown above in a report packet and transmits the report packet to transmitting terminal 101 (S704).

Here, the report packet will be explained.

Figure 14:
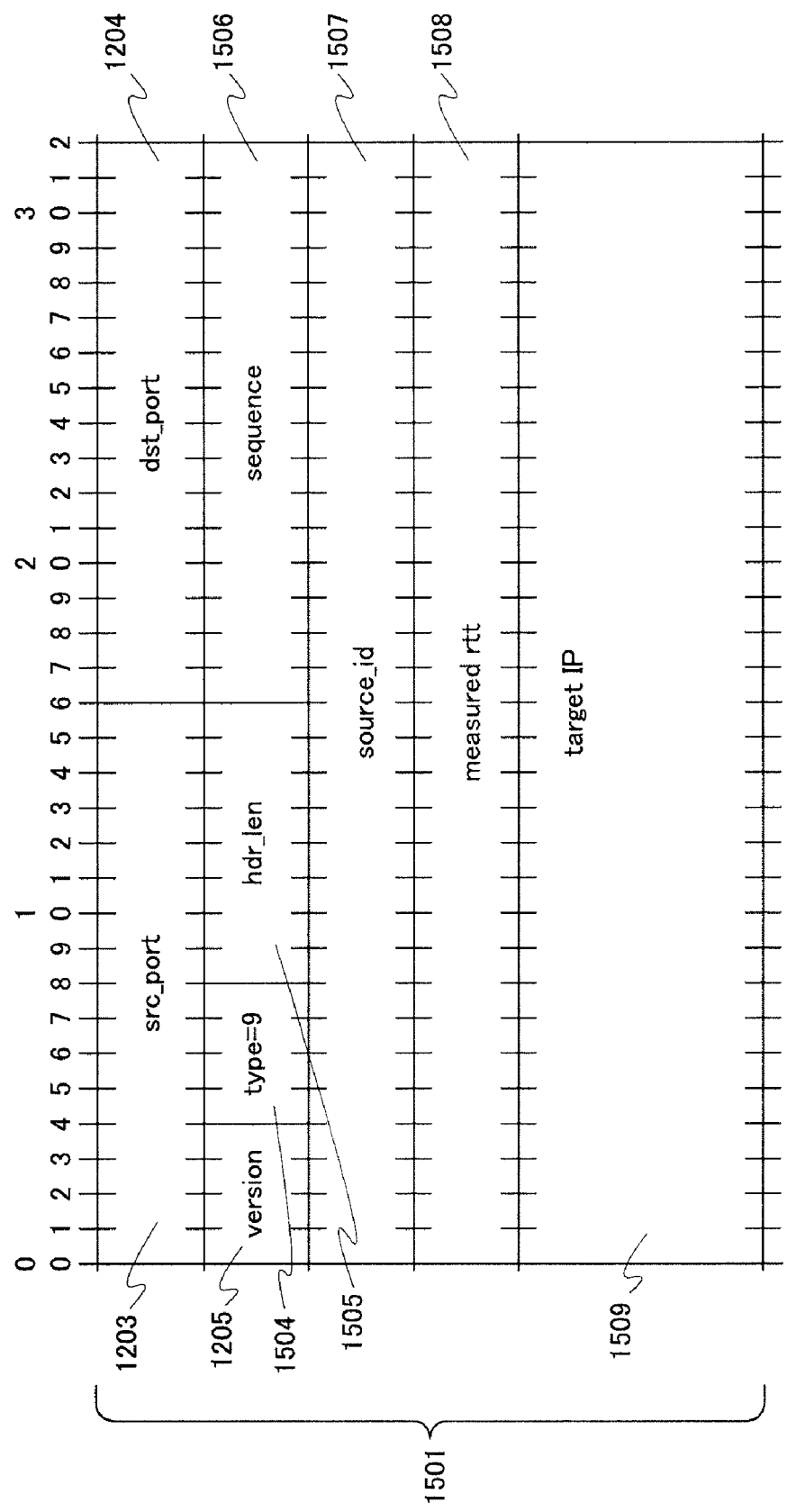
FIG. 14 illustrates a configuration of a report packet according to the embodiment.

FIG. 14 shows a detailed configuration of the report packet.

In FIG. 14, report packet 1501 has transmission port number 1203 to version 1205 and data type 1504 to measurement target 1509. Transmission port number 1203 to version 1205 are the same as those of the XCAST packet B shown in FIG. 10. Data type 1504 is the field showing the packet format. For example, defining "9" as the report packet format in advance allows receiving terminals 105 to 108 and transmitting terminal 101 to identify report packet 1501 from data type 1504. Furthermore, "32" (bytes), which is the length of the report packet, is set in header length 1505. Transmission source identifier 1507 is the field to indicate the identifier to specify the transmission source such as the IP address. Measurement RTT 1508 is the field to store the measured RTT. For example, the RTT between receiving terminal 106 and receiving terminal 107 or the RTT between receiving terminal 107 and receiving terminal 108 are described in this measurement RTT 1508. Furthermore, measurement target 1509 is the field to store the identifier to specify the measurement target such as the IP address. For example, an identifier such as the IP address of receiving terminal 107 or receiving terminal 108 is stored in this measurement target 1509. That is, an identifier such as the IP address that can specify the receiving terminal that has measured the RTT of measured RTT 1508 is stored in measurement target 1509. Report request packet 1401 has packet sequential serial number 1506 in addition to the above-described sections.

As described above, transmitting terminal 101 having received this report packet 1501 can acquire some RTTs of data delivery routes resulting from dividing the delivery route of the XCAST packet.

Next, the RTT estimation processing (S518) performed by transmitting terminal 101 shown in FIG. 3 will be explained.

Figure 15:
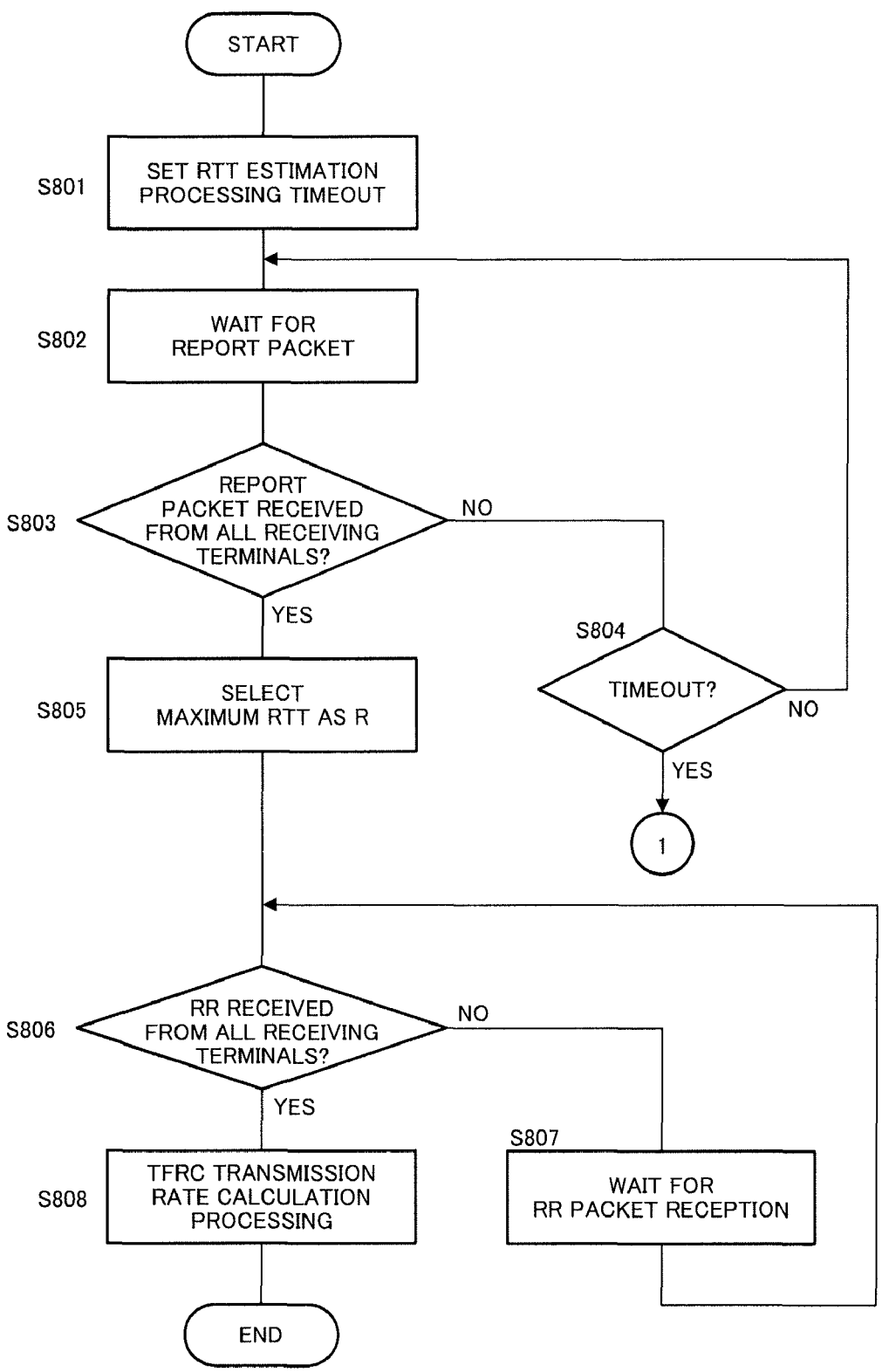
FIG. 15 is a flowchart showing a flow of RTT estimation processing according to the embodiment.

FIG. 15 is a flowchart showing the flow of the RTT estimation processing.

Transmitting terminal 101 selects the maximum RTT from a plurality of RTTs found as described above, and performs RTT estimation processing using the RTT as a value from which the TFRC-based transmission rate can be calculated. Receiving section 402 of transmitting terminal 101 sets a timeout value using a timer in preparation for a case where some of a plurality of receiving terminals 106 to 108 do not return report packets (S801). For example, a value greater than the RTT from transmitting terminal 101 through all receiving terminals 106 to 108 to the final receiving terminal is adopted for this timeout value.

Next, receiving section 402 waits for a report packet from receiving terminals 106 and 107 (S802). When receiving section 402 receives report packets from all receiving terminals 106 and 107 necessary for RTT estimation (S803: YES), round trip time information acquiring section 406 acquires the RTTs on RTT measurement routes 110 and 111 from measurement RTT 1508 of each report packet 1501. As for RTT measurement route 109, this RTT is acquired as an RTT calculated based on the RR packet from receiving terminal 106. Selection section 407 selects the maximum RTT from the RTTs on these RTT measurement routes 109 to 111, and adopts this RTT as the RTT (this is referred to as "R") for use in the calculation by the TFRC scheme (S805).

In this case, calculation section 408 selects the maximum RTT from RTTs upstream of receiving terminals 105 to 108 out of RTTs resulting from divided measurement and calculates the transmission rate. Explaining the present embodiment using, for example, RTT measurement routes 109 to 111 in FIG. 2, calculation section 408 calculates the transmission rate of receiving terminal 106 using the RTT of RTT measurement route 109, the transmission rate of receiving terminal 107 using the RTT of RTT measurement route 109 or 110, whichever is the greater, and the transmission rate of receiving terminal 108 using the maximum RTT from RTT measurement routes 109, 110 and 111.

Next, when there is a receiving terminal that has not transmitted RR packet 1301 to receiving section 402 (S806: NO), receiving section 402 waits for the RR packet of the corresponding receiving terminal (S807).

When receiving section 402 has received RR packet 1301 from all receiving terminals 105 to 108 (S806: YES), calculation section 408 calculates a transmission rate based on the TFRC scheme using the R acquired in selection section 407 and the contents stored in performance band 1311 and loss event rate 1312 of RR packet 1301 (S808).

On the other hand, when there is a receiving terminal that has not transmitted report packet 1501 to receiving section 402 in step S803 (S803: NO), control section 403 decides whether or not a timeout has occurred and waits for a report packet again when no timeout has occurred (S804: NO).

When a timeout has occurred (S804: YES), control section 403 moves to the processing for when a report packet timeout has occurred. That is, when a timeout occurs, this means that receiving section 402 has failed to receive report packet 1501 of all receiving terminals 105 to 108, and therefore selection section 407 adopts the RTTs measured on a concatenated route as normal.

Figure 16:
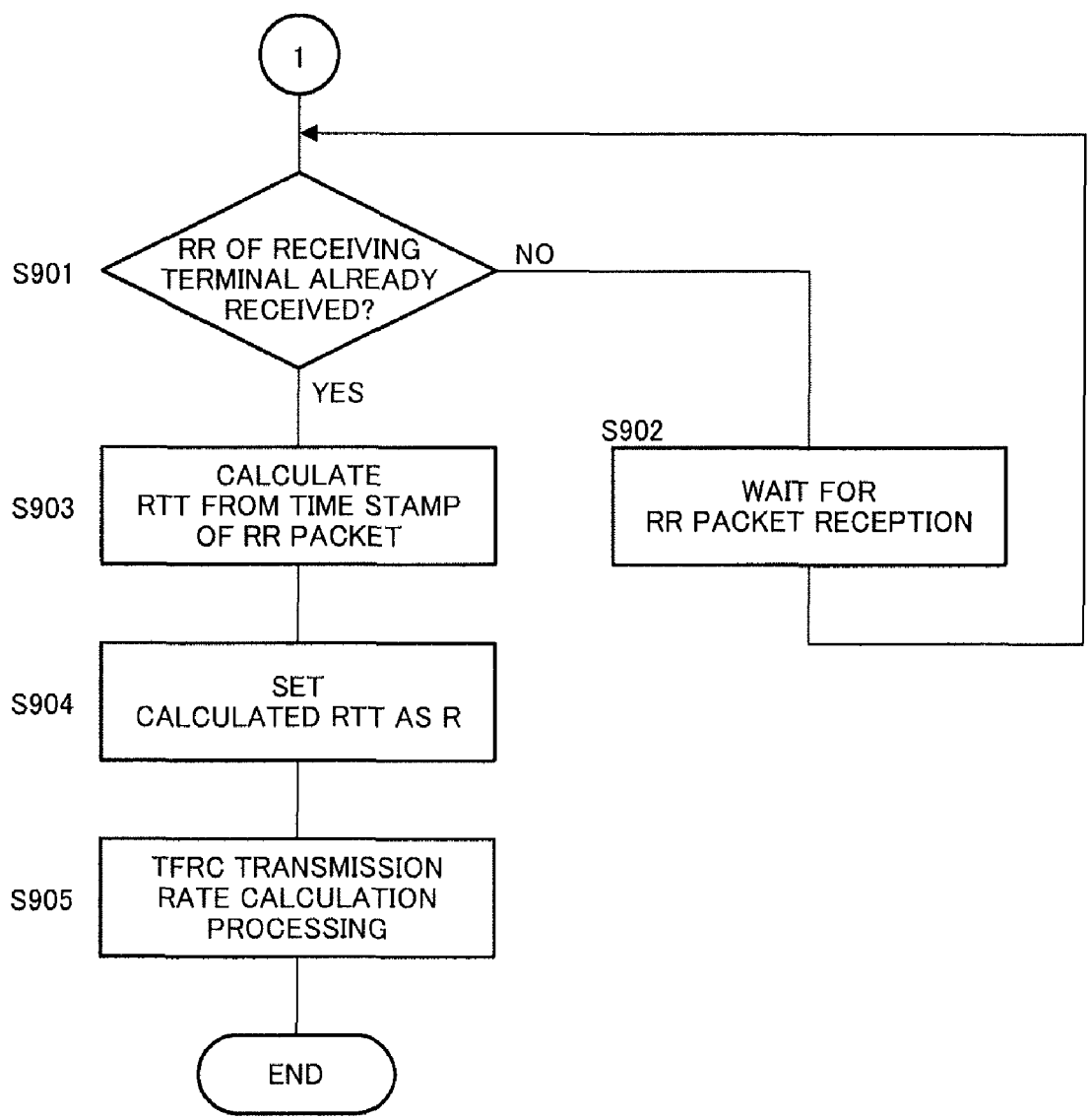
FIG. 16 is a flowchart showing processing when a report packet timeout occurs according to the embodiment.

FIG. 16 is a flowchart showing processing when a report packet timeout has occurred.

Control section 403 decides whether or not RR packet 1301 from the receiving terminal has arrived (S901), and waits, upon deciding that RR packet 1301 has not arrived (S901: NO), an RR packet to arrive (S902). When control section 403 decides that RR packet 1301 has arrived (901: YES), round trip time information acquiring section 406 calculates an RTT from the time stamp stored in time stamp 1308 of RR packet 1301 and the current time of transmitting terminal 101 at the time of reception of the RR packet (S903). This RTT becomes an RTT of when the XCAST packet is transferred through a plurality of receiving terminals in a concatenated manner without being terminated at each receiving terminal. Selection section 407 uses this RTT as an R (S904) and hands over the RTT to calculation section 408 as an RTT for when calculating the transmission rate by the TFRC scheme. Calculation section 408 calculates a transmission rate by the TFRC scheme using performance band 1311 and loss event rate 1312 described in RR packet 1301 (S905). That is, when a timeout has occurred, transmitting terminal 101 performs the operations defined by the normal SICC scheme without performing divided RTT measurement.

As explained above, when no timeout has occurred, the RTT used to estimate a transmittable rate of receiving terminal 108 becomes smaller than the RTT measured in the route from transmitting terminal 101 through receiving terminal 106 and receiving terminal 107 to receiving terminal 108, and as a result, the transmittable rate calculated becomes greater. That is, this eliminates the problem that the performance of data transmission unnecessarily deteriorates.

The operations of transmitting terminal 101 after calculating the transmission rate will be explained next using the configuration diagram of transmitting terminal 101 shown in FIG. 6.

Receiving terminal class classification section 410 assigns receiving terminals 105 to 108 to classes of appropriate transmission rates based on the transmission rates of receiving terminals 105 to 108 calculated in calculation section 408. Class storage section 411 stores the associations between addresses and the classified classes as a result of the classification by above-described receiving terminal class classification section 410. When the classification of classes of the receiving terminals recorded in class storage section 411 has been updated, receiving terminal identifier information creation section 404 creates the delivery destination information again and hands over the delivery destination information to multi-destination packet generation section 405. Transmitting section 409 transmits the packet created in multi-destination packet generation section 405 to the first receiving terminal.

Here, a case of calculating a transmission rate according to the present embodiment will be explained using an example of specific values.

Suppose the RTT measured in the route from transmitting terminal 101 through receiving terminal 106 and receiving terminal 107 to receiving terminal 108 is 50 microseconds, the RTT between transmitting terminal 101 and receiving terminal 106 is 10 microseconds, the RTT between receiving terminal 106 and receiving terminal 107 is 15 microseconds, and the RTT between receiving terminal 107 and receiving terminal 108 is 15 microseconds. In this case, 50 microseconds, which is the RTT measured in the route from transmitting terminal 101 through receiving terminal 106 and receiving terminal 107 to receiving terminal 108 is a measurement result using the conventional scheme. Therefore, according to the conventional scheme, R which is the denominator of equation 1 is 50 microseconds and other p, s and t_RTO are fixed values, and the calculation results in (1/50) x50, and therefore transmittable rate Xcal=1 Mps.

On the other hand, of 10 microseconds and 15 microseconds, which are the above-described measurement results, the present embodiment adopts 15 microseconds, which is the greater one as R of the denominator in equation 1. As a result of the calculation, p, s and t_RTO are assumed to be fixed values as with the conventional case and the calculation results in (1/15)x50, and therefore transmittable rate Xcal is calculated to be approximately 3.33 Mbps. That is, adopting the scheme of the present invention allows transmission at a rate at least three times the conventional one.

The following will show that affinity with TCP can be fulfilled when transmission is carried out at the transmittable rate calculated as shown above.

With the present embodiment, when delivery is performed in the route from transmitting terminal 101 through receiving terminal 106 and receiving terminal 107 to receiving terminal 108, affinity with TCP may be fulfilled through the following three routes to fulfill affinity with TCP.

(i) Route from transmitting terminal 101 to receiving terminal 106

(ii) Route from receiving terminal 106 to receiving terminal 107

(iii) Route from receiving terminal 107 to receiving terminal 108

As described above, information required to calculate the transmittable rates is RTT and loss event rate. The loss event rate is calculated based on the scheme defined in the TFRC scheme (RFC 3448) using the loss measured in receiving terminal 108 as the basis. Here, the RTT is the maximum value of the RTTs observed on routes (i), (ii) and (iii). As described above, since the RTT is an element of the denominator of equation 1, the calculated transmittable rate is equal to or less than values when RTTs of routes (i), (ii) and (iii) are applied to the same equation. This value is referred to as "Xcalmin." Therefore, when transmitting terminal 101 delivers data with Xcalmin, data can be delivered with a value equal to or less than the rate that fulfills affinity with TCP on one of routes (i), (ii) and (iii). That is, affinity with TCP can be maintained.

As explained above, the present embodiment applies the above-described divided RTT measurement to a flow control scheme whereby data is delivered to a plurality of terminals using the SICC scheme or TFRC scheme as in the case of the SICC scheme, and thereby eliminates the necessity to calculate an unnecessarily large RTT when an SICC-based transmitting terminal measures RTT between the transmitting terminal and the receiving terminal, and, as a result, solves the problem that the performance of data transmission deteriorates unnecessarily. To be more specific, in a case where the SICC scheme is applied to such a scene that a video of a meeting is transmitted to a plurality of terminals across a plurality of countries over the Internet or streaming is performed to a plurality of terminals arranged across a plurality of ISPs or carriers using the SICC scheme, applying the scheme of the present invention allows the receiving terminals to receive high quality, high resolution images.

Furthermore, since affinity with TCP can be maintained, even in the case of the above-described application, it is possible to prevent the Internet or a network of a plurality of ISP carriers from congestion. That is, even if many similar video deliveries are performed simultaneously on the Internet or a network of a plurality of ISP carriers, it is possible to continue to deliver best images consequently.

In the present embodiment, a packet having round trip time information is transmitted from a receiving terminal to a transmitting terminal, and, obviously, the present invention provides similar advantages even if a packet having round trip time information is relayed by other terminals and transmitted to a transmitting terminal.

Furthermore, in the present embodiment, a receiving terminal specifically calculates round trip times, but it goes without saying that similar advantages will be provided even if a transmitting terminal or other relaying receiving terminals calculate round trip times based on information such as time stamps reported by the receiving terminals that allows round trip times to be acquired.

The flow control method of the present invention delivers a packet by relay by a plurality of receiving terminals, and this flow control method adopts a configuration including the steps of calculating round trip times of a packet to/from adjoining receiving terminals to which the packet needs to be delivered, selecting a predetermined round trip time based on a predetermined reference from among a plurality of calculated round trip times of the packet to/from the adjoining receiving terminals, and calculating a transmission rate of the packet based on the selected round trip time.

This configuration makes it possible to divide the measurement of a round trip time of a packet for estimating a transmittable rate of the packet between adjoining receiving terminals when delivering the packet.

Furthermore, the flow control method according to one aspect of the present invention adopts a configuration, in which, in the step of calculating the transmission rate, the transmission rate is calculated using TFRC.

This configuration allows flow control that fulfills affinity with TCP.

Furthermore, the flow control method according to the one aspect of the present invention adopts a configuration in which, in the step of selecting a predetermined round trip time, the maximum round trip time is selected from among a plurality of packet round trip times.

This configuration allows transmittable rates to be estimated using an RTT in a bottleneck interval.

Furthermore, the receiving terminal according to an aspect of the present invention is a receiving terminal that delivers a packet to another receiving terminal by relay, and adopts a configuration including a measurement packet transmitting section that transmits a packet including measurement information for measuring round trip times to/from other adjoining receiving terminals to which the packet needs to be delivered, a receiving section that receives a reply packet in response to the packet including the measurement information from the other adjoining receiving terminals, a round trip time information acquiring section that acquires time information about the round trip times of the packet based on the reply packet received in the receiving section, and a round trip time information transmitting section that transmits the packet including the time information about the round trip times of the packet acquired by the round trip time information acquiring section to the transmitting terminal.

This configuration makes it possible to divide the measurement of a round trip time of a packet for estimating a transmittable rate of the packet between adjoining receiving terminals when delivering the packet, and transmit the result to the transmitting terminal.

Furthermore, the receiving terminal according to the one aspect of the present invention adopts a configuration further including a receiving terminal identifier information acquiring section that acquires receiving terminal identifiers of other receiving terminals to which a packet needs to be delivered from a list of the other receiving terminals to which the packet needs to be delivered transmitted from outside, and, in this configuration, the measurement packet transmitting section transmits a packet including measurement information for measuring round trip times, to other adjoining receiving terminals identified by the receiving terminal identifiers acquired by the receiving terminal identifier information acquiring section.

This configuration allows an RTT between the receiving terminals identified from the list of the other adjoining receiving terminals to which the packet needs to be delivered transmitted from outside to be measured.

Furthermore, the transmitting terminal according to one aspect of the present invention is a transmitting terminal that delivers a packet to receiving terminals that deliver the packet by relay, and adopts a configuration including a receiving section that receives a packet including information about round trip times to/from adjoining receiving terminals to which the packet needs to be delivered, a round trip time acquiring section that acquires the round trip time from the packet received by the receiving section, a selection section that selects a predetermined round trip time based on a predetermined reference from among a plurality of round trip times acquired by the round trip time acquiring section, and a calculation section that calculates a transmission rate of the data delivery based on the predetermined round trip time selected in the selection section.

This configuration makes it possible to divide the measurement of a round trip time of a packet for estimating a transmittable rate of the packet between adjoining receiving terminals when delivering the packet and calculate a transmission rate in packet delivery based on a measurement result.

The packet transport system according to an aspect of the present invention is a packet transport system that delivers a packet from a transmitting terminal to a plurality of receiving terminals by relay by the receiving terminals, and adopts a configuration in which a receiving terminal has a measurement packet transmitting section that transmits a packet including measurement information for measuring a round trip time of the packet to/from other adjoining receiving terminals to which the packet needs to be delivered, a receiving terminal receiving section that receives a reply packet in response to the packet including the measurement information from other adjoining receiving terminals, a round trip time information acquiring section that acquires time information about the round trip time of the packet based on the reply packet received by the receiving section and a round trip time information transmitting section that transmits the packet including the time information about the round trip time of the packet acquired in the round trip time information acquiring section to the transmitting terminal, and in which a transmitting terminal has a transmitting terminal receiving section that receives a packet including time information about a round trip time of the packet transmitted from the round trip time information transmitting section, a round trip time acquiring section that acquires the round trip time from the packet received by the transmitting terminal receiving section, a selection section that selects a predetermined round trip time based on a predetermined reference from among a plurality of round trip times acquired by the round trip time acquiring section and a calculation section that calculates a transmission rate of the data delivery based on the predetermined round trip time selected by the selection section.

This configuration makes it possible to divide the measurement of a round trip time of a packet for estimating a transmittable rate of the packet between adjoining receiving terminals when delivering the packet.

That is, when measuring the RTTs between the adjoining receiving terminals, the transmitting terminal calculates the RTTs by dividing a round trip time of the packet to/from the adjoining receiving terminals to which the packet needs to be delivered, and can thereby prevent the transmittable rate from being calculated as a small value and improve the performance of data transmission without damaging affinity with TCP.

The disclosure of Japanese Patent Application No. 2006-270410, filed on Oct. 2, 2006, including the specification, drawings and abstract, is incorporated herein by reference in its entirety.

INDUSTRIAL APPLICABILITY

The flow control method according to the present invention prevents, when an SICC-based transmitting terminal measures a round trip time to/from a receiving terminal, the round trip time from being calculated as an unnecessarily large value, and can consequently improve the performance of data transmission without damaging affinity with TCP. Therefore, when delivering video or audio data or the like to a plurality of terminals, the present invention is useful in performing flow control in accordance with the performance of receiving terminals and network conditions.

The invention claimed is:

1. A flow control method for delivering a data packet transmitted from a transmitting terminal by relay by a receiving terminal, the method comprising:
calculating, for each pair of terminals adjoining on a delivery route, out of a plurality of terminals including the transmitting terminal and the receiving terminal, a round trip time the data packet takes between the terminals;
selecting, from the round trip time calculated for each pair of the terminals adjoining on the delivery route, one round trip time that at least equals a predetermined reference value; and
calculating a transmission rate of the data packet using the one round trip time,
wherein the one round trip time is a maximum round trip time that is selected from the round trip time calculated for each pair of the terminals adjoining on the delivery route.

2. The flow control method according to claim 1, wherein the transmission rate is calculated using a TCP friendly rate control.

3. A receiving terminal that relays a data packet sent from a transmitting terminal to a downstream receiving terminal that adjoins the receiving terminal, the receiving terminal comprising:
a first receiver that receives the data packet from one of the transmitting terminal and an upstream receiving terminal that adjoins the receiving terminal, the data packet defining an upstream path on a delivery route and containing first measurement information for measuring a first round trip time the data packet takes between the receiving terminal and the one of the transmitting terminal and the upstream receiving terminal;
a controller that, when the data packet containing the first measurement information is received by the first receiver from the one of the transmitting terminal and the upstream receiving terminal, transmits a first report packet to the one of the transmitting terminal and the upstream receiving terminal;
a measurement packet transmitter that transmits the data packet to the downstream receiving terminal adjoining the receiving terminal, the data packet defining a downstream path on the delivery route and containing second measurement information for measuring a second round trip time the data packet takes between the receiving terminal and the downstream receiving terminal;
a second receiver that receives a second report packet from the downstream receiving terminal after the measurement transmitter transmits the data packet containing the second measurement information to the downstream receiving terminal;
a round trip time information acquirer that, when the second report packet is received by the second receiver from the downstream receiving terminal, acquires time information about the second round trip time of the data packet containing the second measurement information based on the second report packet; and
a round trip time information transmitter that, when the time information is acquired by the round trip time information acquirer, transmits a third report packet containing the time information to the transmitting terminal,
wherein, when the data packet containing the first measurement information is received by the first receiver, the measurement packet transmitter transmits the data packet containing the second measurement information to the downstream receiving terminal.

4. The receiving terminal according to claim 3, further comprising:
a receiving terminal identifier information acquirer that acquires a receiving terminal identifier from a list that describes receiving terminal identifiers of a plurality of receiving terminals, the receiving terminal identifier identifying the downstream receiving terminal to which the data packet transmitted from the one of the transmitting terminal and the upstream receiving terminal needs to be relayed,
wherein the measurement packet transmitter transmits the data packet containing the second measurement information to the downstream receiving terminal identified by the receiving terminal identifier acquired by the receiving terminal identifier information acquirer.

5. A transmitting terminal that delivers a data packet via receiving terminals that relay the data packet, the transmitting terminal comprising:
a receiver that receives, for each pair of terminals adjoining on a delivery route, out of a plurality of terminals including the transmitting terminal and the receiving terminals, a report packet containing information about a round trip time the data packet takes between the terminals;
a round trip time acquirer that calculates the round trip time for each pair of the terminals from the report packet received for each pair by the receiver;
a selector that selects, from the round trip time calculated for each pair of the terminals by the round trip time acquirer, one round trip time that at least equals a predetermined reference value; and
a calculator that calculates a transmission rate of the data packet using the one round trip time selected by the selector,
wherein the one round trip time is a maximum round trip time that is selected from the round trip time calculated for each pair of the terminals adjoining on a delivery route.

6. A packet transport system that delivers a data packet transmitted from a transmitting terminal by relay by a receiving terminal,
the receiving terminal comprising:
a measurement packet transmitter that transmits the data packet to a downstream receiving terminal adjoining the receiving terminal, the data packet defining an upstream path on a delivery route and containing measurement information for measuring a specific round trip time the data packet takes between the receiving terminal and the downstream receiving terminal;

a receiving terminal receiver that receives a first report packet from the downstream receiving terminal after the measurement transmitter transmits the data packet containing the measurement information to the downstream receiving terminal;

a round trip time information acquirer that acquires time information about the specific round trip time of the data packet containing the measurement information based on the first report packet received by the receiving terminal receiver; and a round trip time information transmitter that transmits, to the transmitting terminal, a second report packet containing the time information acquired by the round trip time information acquirer, and the transmitting terminal comprising:

a transmitting terminal receiver that receives the second report packet from the receiving terminal;

a round trip time acquirer that calculates, for each pair of terminals adjoining on the delivery route out of a plurality of terminals including the transmitting terminal, the receiving terminal, and the downstream receiving terminal, a round trip time between the terminals;

a selector that selects, from the round trip time calculated for each pair of the terminals adjoining on the delivery route by the round trip time acquirer, one round trip time that at least equals a predetermined reference value; and a calculator that calculates a transmission rate of the data packet using the one round trip time selected by the selector, wherein the round trip time acquirer calculates the round trip time between the receiving terminal and the downstream receiving terminal from the second report packet received by the transmitting terminal receiver.

* * * * *